(12) United States Patent
Baksh et al.

(10) Patent No.: US 7,867,320 B2
(45) Date of Patent: Jan. 11, 2011

(54) MULTI-PORT INDEXING DRUM VALVE FOR VPSA

(75) Inventors: Mohamed Safdar Allie Baksh, Wheatfield, NY (US); Michael S. Manning, Buffalo, NY (US); Ashwin Desai, Williamsville, NY (US); Preeti Chandra, Williamsville, NY (US); Paul William Belanger, Clarence City, NY (US)

(73) Assignee: Praxair Technology, Inc., Danbury, CT (US)

( * ) Notice: Subject to any disclaimer, the term of this patent is extended or adjusted under 35 U.S.C. 154(b) by 267 days.

(21) Appl. No.: 12/241,666

(22) Filed: Sep. 30, 2008

(65) Prior Publication Data
US 2010/0077920 A1    Apr. 1, 2010

(51) Int. Cl.
*B01D 53/047* (2006.01)
(52) U.S. Cl. .............................. 95/96; 95/148; 96/130
(58) Field of Classification Search ............ 95/96, 95/148; 96/130
See application file for complete search history.

(56) References Cited

U.S. PATENT DOCUMENTS

| | | | |
|---|---|---|---|
| 3,550,477 A | 12/1970 | Kinnicutt, Jr. | |
| 5,656,068 A | 8/1997 | Smolarek et al. | |
| 6,027,548 A | 2/2000 | Ackley et al. | |
| 6,143,056 A | 11/2000 | Smolarek et al. | |
| 6,253,778 B1 | 7/2001 | Smolarek et al. | |
| 6,889,710 B2 | 5/2005 | Wagner | |
| 6,936,091 B2 | 8/2005 | Bayreuther | |
| 6,959,728 B2 * | 11/2005 | McCombs et al. | 137/624.18 |
| 7,094,275 B2 | 8/2006 | Keefer et al. | |
| 7,276,107 B2 | 10/2007 | Baksh et al. | |
| 7,396,387 B2 | 7/2008 | Baksh et al. | |
| 2008/0000353 A1 | 1/2008 | Rarig et al. | |
| 2008/0006151 A1 | 1/2008 | Baksh et al. | |

FOREIGN PATENT DOCUMENTS

| | | |
|---|---|---|
| EP | 1661596 A2 | 5/2006 |
| WO | WO2005/071297 A1 | 8/2005 |
| WO | WO2006/109639 A1 | 10/2006 |

* cited by examiner

*Primary Examiner*—Robert A Hopkins
(74) *Attorney, Agent, or Firm*—Salvatore P. Pace

(57) ABSTRACT

The present invention relates to a dual feed and dual vacuum four bed VPSA process for selectively adsorbing a component from a feed stream, e.g., nitrogen from air, to produce an oxygen-enriched gas stream using a multi-port indexing drum valve, a system comprising a multi-port indexing drum valve and method for operating such a system.

15 Claims, 15 Drawing Sheets

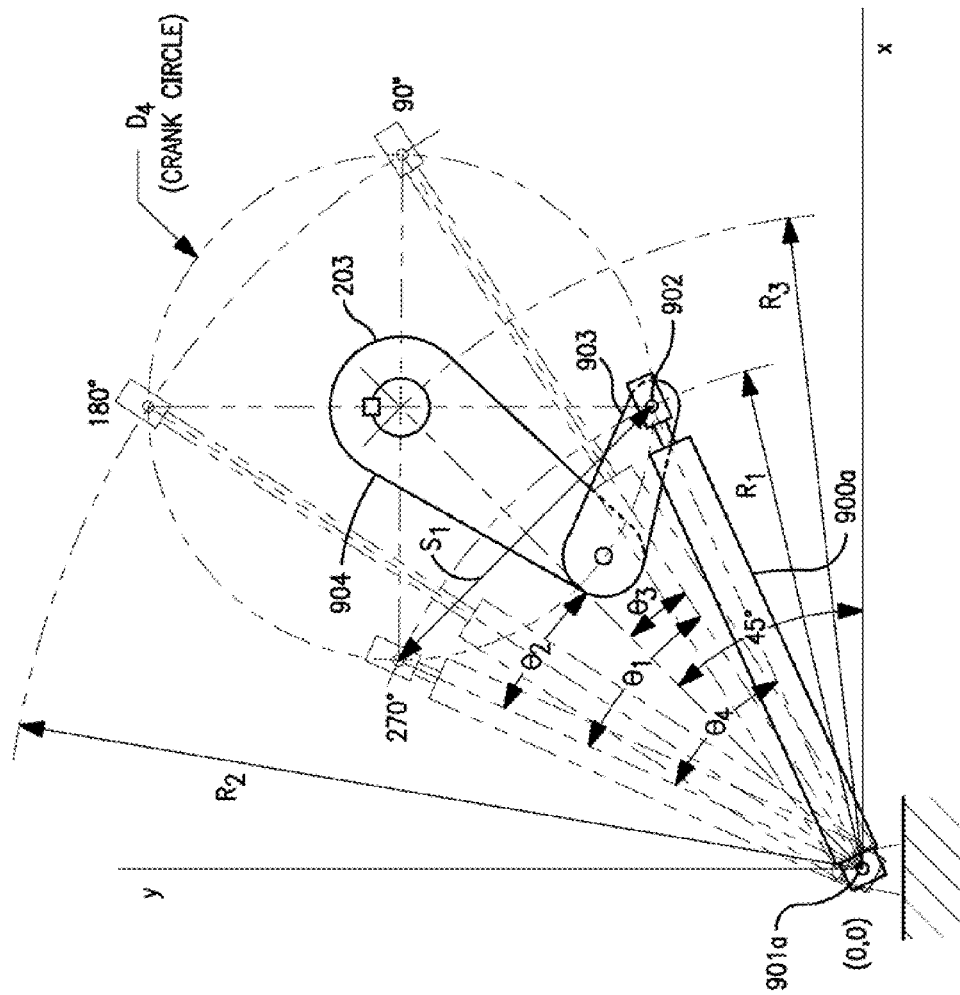
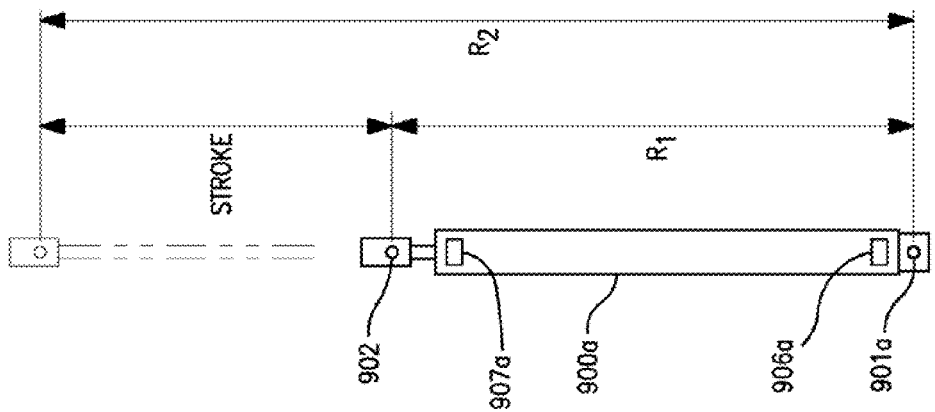
FIG. 12B
FIG. 12A

MULTI-PORT INDEXING DRUM VALVE FOR VPSA

FIELD OF THE INVENTION

The present invention relates to pressure swing adsorption systems for selectively adsorbing a component from a feed stream to produce a gas stream enriched with a desired product and, in particular, to an apparatus and method for operating such a system using a multiport rotary valve.

BACKGROUND OF THE INVENTION

The production of oxygen from air currently uses vacuum pressure swing adsorption (VPSA) or pressure swing adsorption (PSA) systems technology. These systems often have a capacity of less than 200 tons per day $O_2$. Presently, there is renewed interest in extending the capacity of VPSA or PSA systems from such small scale (less than 200 tons per day $O_2$) to large scale (about 350 tons per day $O_2$ or higher) oxygen production from air.

In the application of VPSA or PSA processes, the energy input required to achieve the separation of $O_2$ from the feed mixture (e.g., air) is provided as mechanical work through feed compressor(s) and vacuum pump(s). The cost of this work is a significant component of the total operating cost of the VPSA or PSA process. In addition, VPSA or PSA technology is currently economically competitive with cryogenic distillation only for small scale applications. In order for PSA or VPSA processes to become cost competitive with cryogenic distillation for large scale applications, improved cycles are required to operate the PSA or VPSA processes.

In applications where large scale oxygen production (e.g., 350 tons per day $O_2$) is desirable, four bed VPSA processes are used. One such VPSA process is disclosed in U.S. Pat. No. 7,396,387 (Baksh et al.). U.S. Pat. No. 7,396,387 describes a four bed process which provides an efficient $O_2$ VPSA cycle requiring lower power and hence delivering lower unit cost for $O_2$ production. The four bed $O_2$ VPSA system would need to employ 16 conventional double-ported automatic on/off valves to direct the flow of fluids at the feed and vacuum ends of the adsorbent beds. The capital cost of such a system with 16 conventional on/off valves offsets the benefits achieved by the four bed $O_2$ VPSA cycle. Void volumes due to complex piping required by the 16 conventional on/off valves further reduce the benefits. The maintenance cost to service the 16 conventional on/off valves increases due to increased number of valves. Quick synchronous operations of the conventional on/off valves required by the new cycle imply additional costs.

Recently, U.S. Patent Application Publication No. 2008/0006151 (Baksh et al.) disclosed a polybed VPSA process and system to achieve enhanced $O_2$ recovery. The VPSA process described therein uses three or more adsorber beds; providing a continuous feed using a single feed blower to one bed, wherein at any instant during the process, two beds are in an evacuation step and only one bed is in a feed mode; and purging the adsorber beds using two purge gases of different purity. According to the disclosure, about 10-20% improvement in $O_2$ productivity is realized in the new VPSA process. However, the disclosed process uses 16 conventional on/off valves which increase the capital cost of the system.

U.S. Pat. No. 6,143,056 (Smolarek et al.) discloses a dual-chambered, four-ported rotary valve with a rotatable drum having peripheral openings. The valve is used to selectively connect vacuum, and/or air sources and a vent to adsorption chambers in a two bed VPSA system to replace separate valves and produce low cost enriched oxygen, via reduced power, increased reliability, and reduced complexity and cost. However, in accordance with the invention of U.S. Pat. No. 6,143,056, the rotary valve can only replace 8 conventional on/off valves when used in a four bed VPSA system. Thus, two such valves would be required to replace the 16 conventional on/off valves in a four bed VPSA system, requiring two driving mechanisms (i.e., one for each valve) and resulting in increased capital cost.

U.S. Pat. No. 6,253,778 (Smolarek et al.) discloses a rotary valve having first and second inlet/outlet flow passages, as well as one or more (preferably between 6 and 8) flow ports. The valve has a plurality of positions simultaneously interconnecting the first and second flow passage to selected flow ports. In a preferred embodiment, the valve has a housing and the flow ports are disposed on outer peripheral walls of the housing. The valve may further include an internal rotary plug that is rotatable about a longitudinal axis to move between the positions, and containing openings to connect the flow passages to the flow ports. The plug may be divided into two chambers in the valve which may or may not be moved independently of each other. The valve may further include a movable seal between the housing and the internal plug member which is retractable to permit freer movement of the plug. However, such a rotary valve will only replace 8 conventional on/off valves when used in a four bed VPSA system. Furthermore, two such valves would be required to replace the 16 conventional on/off valves in the four bed VPSA system, requiring two driving mechanisms (i.e., one for each valve) and resulting in increased capital cost.

U.S. Pat. No. 6,889,710 (Wagner) discloses a rotary sequencing valve comprising a rotor having a rotor face rotatable about an axis perpendicular to the rotor face, wherein the rotor face has a plurality of openings, one or more of which are disposed at a selected radial distance from the axis, and wherein the rotor includes at least one passage connecting at least one pair of the plurality of openings. The valve includes a flexible port plate having a first side and a second side, wherein the first side faces the rotor and engages the rotor such that the flexible port plate can be rotated coaxially by the rotor and can move axially with respect to the rotor, wherein the flexible port plate has a plurality of ports between the first and second sides, which ports are aligned with the openings in the rotor face. The valve also includes a stator having a stator face disposed coaxially with the rotor and the flexible port plate, wherein the second side of the flexible port plate is in sealable, slidable rotary contact with the stator face, wherein the stator face has a plurality of openings, some of which are disposed at the selected radial distance from the axis, and wherein the plurality of openings extend as passages through the stator. The valve may be used in pressure or temperature swing adsorption systems. However, the Wagner rotary valve is not suitable for large capacity $O_2$ VPSA systems (i.e., approaching 200 tons per day $O_2$) without becoming excessively expensive and prohibitively large in size and weight.

U.S. Pat. No. 6,936,091 (Beyreuther) discloses a valve assembly for use in a gas purification system having a plurality of vessels each having a first port opening and a second port opening. The gas purification system includes a first valve element having a first aperture to selectively connect a first port opening of a vessel to an outlet of the first valve element. The gas purification system also includes a second valve element having a second aperture to selectively connect a second port opening of a vessel to an input of the second valve element. Also provided are a motor adapted to rotate continuously and a converting mechanism that converts continuous movement of the motor into intermittent movement.

The first and second valve elements are intermittently moved by the motor and the converting mechanism such that the intermittent movement changes the vessel connected to the second aperture and the vessel connected to the first aperture. However, in accordance with the teachings of U.S. Pat. No. 6,936,091, the rotary valve is not suitable for large capacity $O_2$ VPSA systems (i.e., approaching 200 tons per day $O_2$) without becoming excessively expensive and prohibitively large in size. In addition, the port size to accommodate larger capacities tends to increase the outer diameter and height of the valve, making it extremely large in size and weight.

U.S. Pat. No. 7,094,275 (Keefer et al.) discloses a rotary module for implementing a high frequency pressure swing adsorption process that comprises a stator and a rotor rotatably coupled to the stator. The stator includes a first stator valve surface, a second stator valve surface, a plurality of first function compartments opening into the first stator valve surface, and a plurality of second function compartments opening into the second stator valve surface. The rotor includes a first rotor valve surface in communication with the first stator valve surface, a second rotor valve surface in communication with the second stator valve surface, and a plurality of flow paths for receiving adsorbent material therein. Each flow path includes a pair of opposite ends, and a plurality of apertures provided in the rotor valve surfaces and in communication with the flow path ends and the function ports for cyclically exposing each flow path to a plurality of discrete pressure levels between the upper and lower pressures for maintaining uniform gas flow through the first and second function compartments. In accordance with the teachings of Keefer et al., the rotary valve is not suitable for large capacity $O_2$ VPSA systems (e.g., 200 tons per day $O_2$) without becoming excessively expensive and prohibitively large in size. In using the teachings of Keefer et al., for large VPSA $O_2$ system, the moving parts including the adsorbent beds can become prohibitively heavy in systems of large capacity and can require substantial amount of power to rotate it; whereas, in the present invention, the drum valve can be used for 200 tons per day $O_2$ VPSA systems and can be easily scaled up for larger capacity VPSA $O_2$ systems (e.g., 350 tons per day of $O_2$ or higher). In accordance with the teachings of the present invention, the weight and size of the drum valve are easily manageable and the moving parts of the drum valve are made of light materials (low density) for use in VPSA $O_2$ systems using non-rotating or stationary adsorbent beds.

U.S. Pat. No. 7,276,107 (Baksh et al.) discloses a PSA system using an indexing rotary dual valve regulating a stepping mode of operation that controls a variable bed inlet feed flow rate, controllable pressure between feed lines in different beds of the PSA system and varied output flow rate of product gas such as high purity hydrogen gas. The rotary valve of U.S. Pat. No. 7,276,107 is not suitable for large capacity $O_2$ VPSA systems (e.g., 200 tons per day $O_2$) without becoming excessively expensive and prohibitively large in size. The port size to accommodate larger capacities tends to increase the outer diameter and height of the valve, making it extremely large in size and weight.

U.S. Patent Application Publication No. 2008/0000353 (Rarig et al.), discloses a pressure swing adsorption system comprising two or more vessels, each having a feed end, a product end, and adsorbent material adapted to adsorb one or more components from a multi-component feed gas mixture; piping adapted to (1) introduce the feed gas mixture into the feed ends, withdraw a product gas from the product ends, and withdraw a waste gas from the feed ends of the vessels, and (2) place the product ends of any pair of vessels in flow communication; a feed pipe adapted to supply the feed gas mixture to the system; a product pipe adapted to withdraw the product gas from the system; and a waste gas pipe adapted to withdraw the waste gas from the system. An indexed rotatable multi-port valve is adapted to place the product end of each vessel in sequential flow communication with the product end of each of the other vessels. However, as with the other prior art described herein, the rotary valve is not suitable for large capacity $O_2$ VPSA systems (e.g., 200 tons per day $O_2$) without becoming excessively expensive and prohibitively large in size. Also, the port size to accommodate larger capacities will increase the outer diameter and height of the valve, making it extremely large in size and weight.

Thus, a valve that can be used for a large VPSA system (e.g., 200 tons per day VPSA $O_2$) and can be easily scaled up for larger capacity $O_2$ VPSA systems (e.g., 350 tons per day of $O_2$ or higher) is needed. In accordance with the design features of this invention, the weight and size of the drum valve are easily manageable versus prior art rotary valve designs. The present invention replaces the 16 conventional on/off valves in the Baksh et al., invention with one drum valve that performs the function of the 16 conventional on/off valves at a reduced capital cost. In addition, in the present invention, the drum valve also reduces the piping and void volume that was added due to use of 16 conventional on/off valves. Furthermore, the drum valve in the present invention results in reduction in maintenance costs and permits quick changes in cycle steps. Other features that reduce the cost of the present invention as compared to the prior art include but are not limited to the following: presence of a partitioned drum design which also adds to the structural integrity of the valve, presence of a modular seal design, presence of inexpensive sealing mechanisms, presence of inexpensive rotating and indexing mechanism.

BRIEF SUMMARY OF THE INVENTION

The present invention is directed to, in a first aspect, an apparatus for separating components from a fluid mixture comprising two sources of feed fluid at elevated pressures and two sources of regeneration fluid at reduced pressures. The apparatus further includes four chambers or adsorbent beds, each containing an adsorbent for selectively adsorbing a component from the fluid. The apparatus further includes a multi-port indexing drum valve containing a rotary plug with multiple flow passages, wherein the valve has a plurality of positions simultaneously interconnecting the two sources of feed fluid and the two sources of regeneration fluid to selected flow ports. The drum valve is operatively connected to said sources of feed fluid and said sources of regeneration fluid by a first flow passage, to said first chamber by a first flow port, by a second flow passage, to said second chamber by a second flow port, by a third flow passage, to said third chamber by a third flow port, and by a fourth flow passage to said fourth chamber by a fourth flow port, said valve having a plurality of positions independently interconnecting the two sources of feed fluid and two sources of regeneration fluid through said flow passages of the plug with said adsorbent beds via selected flow ports without any fluid mixing.

The plug in a first position connects said first source of feed fluid to said first chamber and introduces feed fluid therein to selectively remove a desired component from said feed fluid while simultaneously connecting said second source of feed fluid to said fourth chamber and introduces fluid therein to selectively remove a desired component from said fluid while simultaneously connecting said first source of regeneration fluid to said third chamber to evacuate feed fluid from said third chamber and connecting said second source of regeneration fluid to said second chamber to evacuate fluid from said second adsorbent bed.

The plug in a second position connects said first source of feed fluid to said second chamber and introduces fluid therein to selectively remove a desired component from said feed fluid while simultaneously connecting said second source of feed fluid to said first chamber and introduces feed fluid therein to selectively remove a desired component from said feed fluid while simultaneously connecting said first source of regeneration fluid to said fourth chamber to evacuate feed fluid from said fourth chamber and connecting said second source of regeneration fluid to said third chamber to evacuate fluid from said third chamber.

The plug in a third position connects said first source of feed fluid to said third chamber and introduce feed fluid therein to selectively remove a desired component from said feed fluid while simultaneously connecting said second source of feed fluid to said second chamber and introduce feed fluid therein to selectively remove a desired component from said feed fluid while simultaneously connecting said first source of regeneration fluid to said first chamber to evacuate feed fluid from said first adsorbent bed and connecting said second source of regeneration fluid to said fourth chamber to evacuate feed fluid from said fourth chamber.

The plug in a fourth position connects said first source of feed fluid to said fourth chamber and introduces feed fluid therein to selectively remove a desired component from said feed fluid while simultaneously connecting said second source of feed fluid to said third chamber and introduce feed fluid therein to selectively remove a desired component from said feed fluid while simultaneously connecting said first source of regeneration fluid to said second chamber to evacuate fluid from said second chamber and connecting said second source of regeneration fluid to said first chamber to evacuate feed fluid from said first chamber.

The valve comprises a housing containing a rotary plug, wherein the housing comprises flow ports that are disposed on the outer peripheral wall of the housing. The rotary plug comprises openings to connect said flow passages to said flow ports. The valve further comprises at least one inflatable seal between the housing and the rotary plug. The inflatable seal may be deflated in order to permit free movement of said plug between said plurality of positions and when inflated prevents fluid communication of the two sources of feed fluid and the two sources of regeneration fluid while the fluids independently communicate with the selected adsorbent beds.

In another aspect of the present invention is directed to a method for separating components from a fluid mixture comprising the steps of:

a) providing a first source of feed fluid (Feed 1) and a second source of feed fluid (Feed 2); a first source of regeneration fluid (e.g., vacuum in VPSA process; Vacuum 1) and a second source regeneration fluid (e.g., vacuum in VPSA process; Vacuum 2); and first, second, third and fourth chambers, each chamber adapted to selectively remove a component from said feed fluid;

b) providing a valve containing a rotary plug comprising at least one flow passage, wherein the valve is operatively connected to the sources of feed fluid and the sources of regeneration fluid;

c) moving said plug to a first position to connect said first source of feed fluid to said first adsorbent bed and introduce feed fluid therein to selectively remove a desired component from said fluid while simultaneously connecting said second source of feed fluid to said fourth adsorbent bed and introduce feed fluid therein to selectively remove a desired component from said fluid while simultaneously connecting said first source of regeneration fluid to said third adsorbent bed to evacuate feed fluid from said third adsorbent bed and connecting said second source of regeneration fluid to said second adsorbent bed to evacuate feed fluid from said second adsorbent bed;

d) moving said plug to a second position to connect said first source of feed fluid to said second chamber and introduce fluid therein to selectively remove a desired component from said feed fluid while simultaneously connecting said second source of feed fluid to said first chamber and introduce fluid therein to selectively remove a desired component from said feed fluid while simultaneously connecting said first source of regeneration fluid to said fourth chamber to evacuate feed fluid from said fourth chamber and connecting said second source of regeneration fluid to said third chamber to evacuate feed fluid from said third chamber;

e) moving said plug to a third position to connect said first source of feed fluid to said third chamber and introduce fluid therein to selectively remove a desired component from said feed fluid while simultaneously connecting said second source of feed fluid to said second chamber and introduce fluid therein to selectively remove a desired component from said feed fluid while simultaneously connecting said first source of regeneration fluid to said first chamber to evacuate feed fluid from said first chamber and connecting said second source of regeneration fluid to said fourth chamber to evacuate feed fluid from said fourth chamber; and f) moving said plug to said fourth position to connect said first source of feed fluid to said fourth chamber and introduce feed fluid therein to selectively remove a desired component from said fluid while simultaneously connecting said second source of feed fluid to said third chamber and introduce feed fluid therein to selectively remove a desired component from said fluid while simultaneously connecting said first source of regeneration fluid to said second chamber to evacuate feed fluid from said second chamber and connecting said second source of regeneration fluid to said first chamber to evacuate feed fluid from said first chamber.

One embodiment of the present invention relates to a dual feed and dual vacuum four bed VPSA process for selectively adsorbing a component from a feed stream, e.g., nitrogen from air, to produce an oxygen-enriched gas stream using a multi-port indexing drum valve, a system comprising a multi-port indexing drum valve and method for operating such a system.

BRIEF DESCRIPTION OF THE DRAWINGS

For a more complete understanding of the present invention and the advantages thereof, reference should be made to the following Detailed Description taken in conjunction with the accompanying drawings in which:

FIGS. 12A and 12B are schematics illustrating the geometry of the two-piston drive mechanism of the present invention.

DETAILED DESCRIPTION OF THE INVENTION

Figure 1:
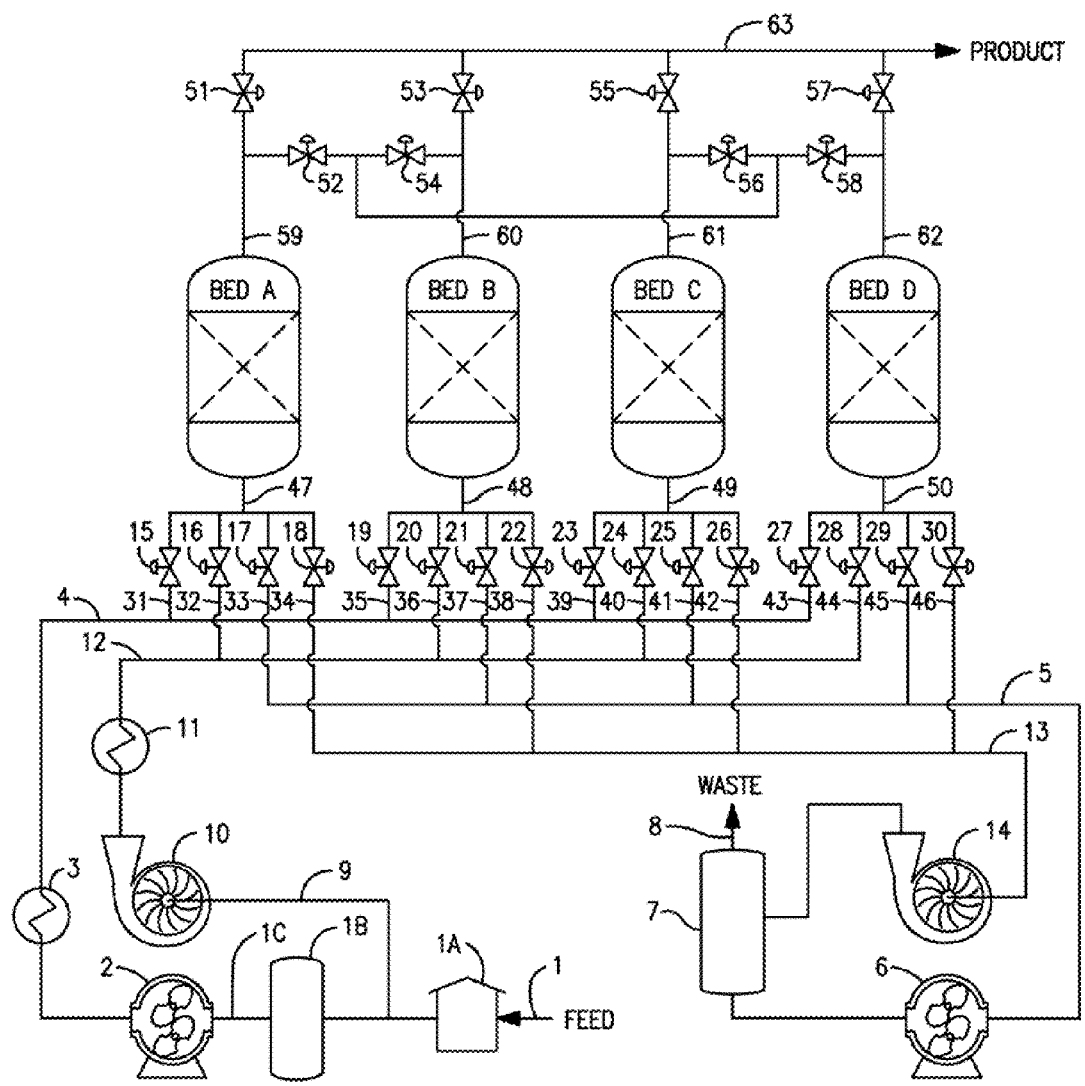
FIG. 1 is a schematic illustrating a four bed VPSA process as set forth in U.S. Pat. No. 7,396,387.

As used herein, the terms "adsorbent bed", "bed" and "chamber" will be used interchangeably to refer to a chamber containing adsorbent materials.

The present invention is directed to, in a first aspect, an apparatus for separating components from a fluid mixture comprising two sources of feed fluid at elevated pressures and two sources of regeneration fluid at reduced pressures. The apparatus further includes four chambers, each containing an adsorbent for selectively adsorbing a component from the fluid. The apparatus further includes a multi-port indexing drum valve comprising a housing containing a rotary plug with multiple flow passages, wherein the valve has a plurality of positions simultaneously interconnecting the two sources of feed fluid and the two sources of regeneration fluid to selected flow ports. The valve housing comprises flow ports that are disposed on the outer peripheral wall of the housing. The rotary plug comprises openings to connect said flow passages to said flow ports.

The drum valve is operatively connected to said sources of feed fluid and said sources of regeneration fluid by a first flow passage, to said first chamber by a first flow port, by a second flow passage, to said second chamber by a second flow port, by a third flow passage, to said third chamber by a third flow port, and by a fourth flow passage to said fourth chamber by a fourth flow port, said valve having a plurality of positions independently interconnecting the two sources of feed fluid and two sources of regeneration fluid through said flow passages of the plug with said adsorbent beds via selected flow ports without any fluid mixing.

The plug in a first position connects said first source of feed fluid to said first chamber and introduces feed fluid therein to selectively remove a desired component from said feed fluid while simultaneously connecting said second source of feed fluid to said fourth chamber and introduces fluid therein to selectively remove a desired component from said fluid while simultaneously connecting said first source of regeneration fluid to said third chamber to evacuate feed fluid from said third chamber and connecting said second source of regeneration fluid to said second chamber to evacuate fluid from said second adsorbent bed.

The plug in a second position connects said first source of feed fluid to said second chamber and introduces fluid therein to selectively remove a desired component from said feed fluid while simultaneously connecting said second source of feed fluid to said first chamber and introduces feed fluid therein to selectively remove a desired component from said feed fluid while simultaneously connecting said first source of regeneration fluid to said fourth chamber to evacuate feed fluid from said fourth chamber and connecting said second source of regeneration fluid to said third chamber to evacuate fluid from said third chamber.

The plug in a third position connects said first source of feed fluid to said third chamber and introduce feed fluid therein to selectively remove a desired component from said feed fluid while simultaneously connecting said second source of feed fluid to said second chamber and introduce feed fluid therein to selectively remove a desired component from said feed fluid while simultaneously connecting said first source of regeneration fluid to said first chamber to evacuate feed fluid from said first adsorbent bed and connecting said second source of regeneration fluid to said fourth chamber to evacuate feed fluid from said fourth chamber.

The plug in a fourth position connects said first source of feed fluid to said fourth chamber and introduces feed fluid therein to selectively remove a desired component from said feed fluid while simultaneously connecting said second source of feed fluid to said third chamber and introduce feed fluid therein to selectively remove a desired component from said feed fluid while simultaneously connecting said first source of regeneration fluid to said second chamber to evacuate fluid from said second chamber and connecting said second source of regeneration fluid to said first chamber to evacuate feed fluid from said first chamber.

The valve further comprises at least one inflatable seal between the housing and the rotary plug. The inflatable seal may be deflated in order to permit free movement of said plug between said plurality of positions and prevents fluid communication of the two sources of feed fluid and the two sources of regeneration fluid while the fluids independently communicate with the selected adsorbent beds. The inflatable seal may be comprised of ethylene propylene diene monomer rubber, nitrile or butyl. The inflatable seal material may also utilize fabric reinforcement, wherein the fabric can be Kevlar®, nylon or Nomex®.

The valve further comprises multiple circumferential seals between said housing and said plug which permits free movement of said plug between said positions and prevents fluid communication of the two sources of feed fluid and the two sources of regeneration fluid while the fluids independently communicate with the selected adsorbent beds. The circumferential seal may be a spring energized polytetrafluoroethylene seal.

The valve further comprises multiple wiper seals between said housing and said plug which permits free movement of said plug between said positions and reduced fluid communication of the two sources of feed fluid and the two sources of regeneration fluid while the plug is undergoing change in position. The wiper seal may be comprised of rubber.

There is space between the housing and the rotary plug. In one embodiment, this space between the inner wall of the housing and the outer wall of the plug is less than 0.5 inch. In another embodiment this space is less than 0.125 inch.

The valve further comprises an indexing drive mechanism that controls the rotation of the plug. In one embodiment, the indexing drive mechanism is comprised of two pistons which impart the motion to the valve plug member. In another embodiment, the indexing drive mechanism is comprised of reed switches for detecting the position of the pistons to prevent inflatable seals from inflating while said plug is in motion.

In one embodiment of the invention, the thickness of the wall of the rotary plug is less than 10% of the diameter of the valve housing, preferably from 0.2% to 5%.

The plug may be constructed of carbon steel, high strength steel, high strength steel alloy, titanium, aluminum, carbon fiber or other composite materials with or without substrates.

In another aspect of the present invention is directed to a method for separating components from a fluid mixture comprising the steps of:

a) providing a first source of feed fluid (Feed 1) and a second source of feed fluid (Feed 2); a first source of regeneration fluid (e.g., vacuum in VPSA process; Vacuum 1) and a second source regeneration fluid (e.g., vacuum in VPSA process; Vacuum 2); and first, second, third and fourth chambers, each chamber adapted to selectively remove a component from said feed fluid;

b) providing a valve containing a rotary plug comprising at least one flow passage, wherein the valve is operatively connected to the sources of feed fluid and the sources of regeneration fluid;

c) moving said plug to a first position to connect said first source of feed fluid to said first adsorbent bed and introduce feed fluid therein to selectively remove a desired component from said fluid while simultaneously connecting said second source of feed fluid to said fourth adsorbent bed and introduce feed fluid therein to selectively remove a desired component from said fluid, while simultaneously connecting said first source of regeneration fluid to said third adsorbent bed to evacuate feed fluid from said third adsorbent bed and connecting said second source of regeneration fluid to said second adsorbent bed to evacuate feed fluid from said second adsorbent bed;

d) moving said plug to a second position to connect said first source of feed fluid to said second adsorbent bed and introduce fluid therein to selectively remove a desired component from said feed fluid while simultaneously connecting said second source of feed fluid to said first adsorbent bed and introduce fluid therein to selectively remove a desired component from said feed fluid while simultaneously connecting said first source of regeneration fluid to said fourth adsorbent bed to evacuate feed fluid from said fourth adsorbent bed and connecting said second source of regeneration fluid to said third adsorbent bed to evacuate feed fluid from said third adsorbent bed;

e) moving said plug to a third position to connect said first source of feed fluid to said third adsorbent bed and introduce fluid therein to selectively remove a desired component from said feed fluid while simultaneously connecting said second source of feed fluid to said second adsorbent bed and introduce fluid therein to selectively remove a desired component from said feed fluid while simultaneously connecting said first source of regeneration fluid to said first adsorbent bed to evacuate feed fluid from said first adsorbent bed and connecting said second source of regeneration fluid to said fourth adsorbent bed to evacuate feed fluid from said fourth adsorbent bed; and f) moving said plug to said fourth position to connect said first source of feed fluid to said fourth adsorbent bed and introduce feed fluid therein to selectively remove a desired component from said fluid while simultaneously connecting said second source of feed fluid to said third adsorbent bed and introduce feed fluid therein to selectively remove a desired component from said fluid while simultaneously connecting said first source of regeneration fluid to said second adsorbent bed to evacuate feed fluid from said second adsorbent bed and connecting said second source of regeneration fluid to said first adsorbent bed to evacuate feed fluid from said first adsorbent bed.

The valve in step (b) includes a housing and a rotatable internal plug having internal passageways to connect said flow passages to selected flow ports, and further including the steps of rotating said drum prior to each of steps (c), (d), (e) and (f) to connect said flow passages to selected flow ports.

The valve in step (b) includes a housing, an internal plug, rotatable between said positions to connect said flow passages to selected flow ports, and inflatable, circumferential and wiper seals between said housing and said internal plug, and the method further includes the steps of deflating said inflatable seal before moving said plug to said positions to permit free movement of said plug between said positions. The rotary plug is supported on either side of the valve by bearings, e.g., ball, deep groove or roller bearings.

There is space between the housing and the rotary plug.

The valve further comprises an indexing drive mechanism that controls the rotation of the plug.

In one embodiment of the invention, the thickness of the wall of the rotary plug is less than 10% of the diameter of the valve housing, preferable from 0.2% to 5%.

The plug may be constructed of carbon steel, high strength steel, high strength steel alloy, titanium, aluminum, carbon fiber or other composite materials with or without substrates.

The valve housing can be constructed of a material that is the same or different from the rotary plug. Generally, the rotary plug should be lighter than the valve housing.

Figure 2:
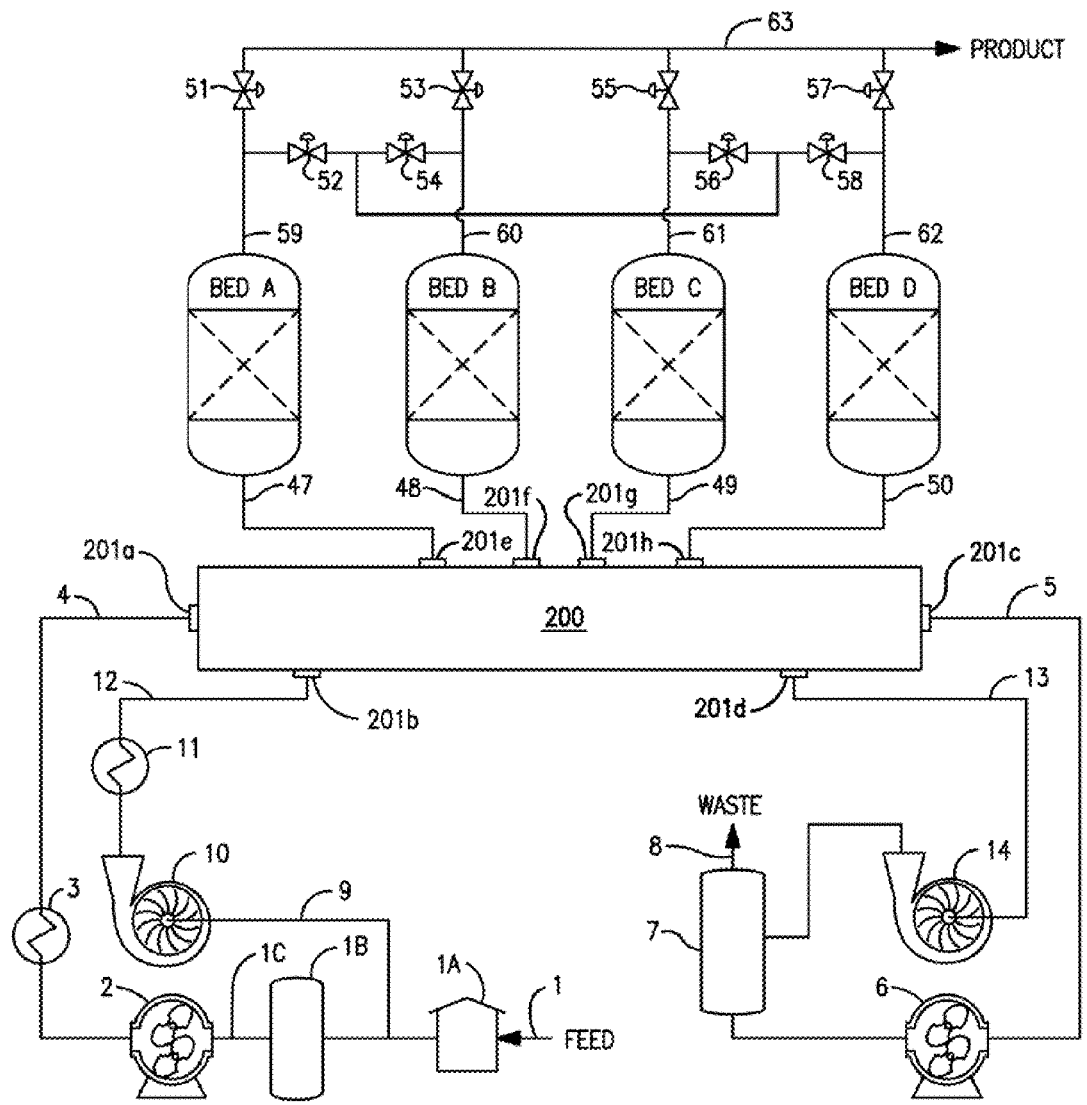
FIG. 2 is a schematic illustrating a four bed VPSA process using a multi-port indexing drum valve of the present invention.

One embodiment of the invention is illustrated by the figures. FIG. 1 shows the prior art four bed VPSA $O_2$ system using 16 conventional on/off valves to direct the flow of fluids at the feed and vacuum ends of the adsorbent beds (see U.S. Pat. No. 7,396,387). FIG. 2 shows the use of a drum valve 200 to replace the 16 conventional on/off valves in the prior art system of FIG. 1. Referring to FIG. 2, feed air is passed in line 1 to inlet filter 1A, inlet silencer 1B, and pipe 1C to a rotary-lobe feed air blower 2 and into feed aftercooler 3 from which it is passed through line 4 for passage to the bottom or feed end of beds A, B, C and D. During bed regeneration steps, gas is discharged for passage from one bed to another or to manifold 5 for passage to rotary-lobe vacuum blower 6 and discharged from the system through vacuum discharge silencer 7 and exit line 8. In addition, feed air is passed simultaneously (dual feed VPSA process) through line 9 to centrifugal feed air compressor 10 and into feed aftercooler 11 from which it is passed through line 12 to the bottom or feed end of beds A, B, C and D. Furthermore, during bed regeneration, gas is also discharged for passage from one bed to another or to manifold 13 for passage to centrifugal vacuum compressor 14 and discharge through discharge silencer 7 to exit line 8. Typically, in the prior art (e.g., FIG. 1), 16 conventional double-ported automatic on/off valves (i.e., valves 15-30) are in fluid communication with said lines 4 and 12 and with said manifolds 5 and 13 through lines 31-46 as shown. Also, in the prior art VPSA system of FIG. 1, each group of four valves is in fluid communication with the bottom of one of the adsorbent beds, that is, valves 15-18 are in fluid communication with the bottom of bed A through line 47, valves 19-22 are in fluid communication with the bottom of bed B through line 48, valves 23-26 are in fluid communication with the bottom of bed C through line 49, and valves 27-30 are in fluid communication with the bottom of bed D through valve 50. However, in the present invention, one drum valve replaces the function of 16 conventional on/off valves. Thus, in this invention, the drum valve 200 of FIG. 2 is in fluid communication with said lines 4 and 12 and with said manifolds 5 and 13.

In the preferred mode of operation depicted in FIG. 2, the top or discharge ends of the adsorber beds utilize conventional on/off valves to facilitate greater level of controls of the various steps in the VPSA cycle. More specifically, in the preferred mode of operation, the discharge end of the beds, valve sets 51-52, 53-54, 55-56 and 57-58 are provided with fluid communication from each bed being provided by the indicated lines, i.e., line 59 from bed A, line 60 from bed B, line 61 from bed C and line 62 from bed D. Gas passing through valves 51, 53, 55 and 57 pass to oxygen product line 63 for recovery from the system.

Figure 3:
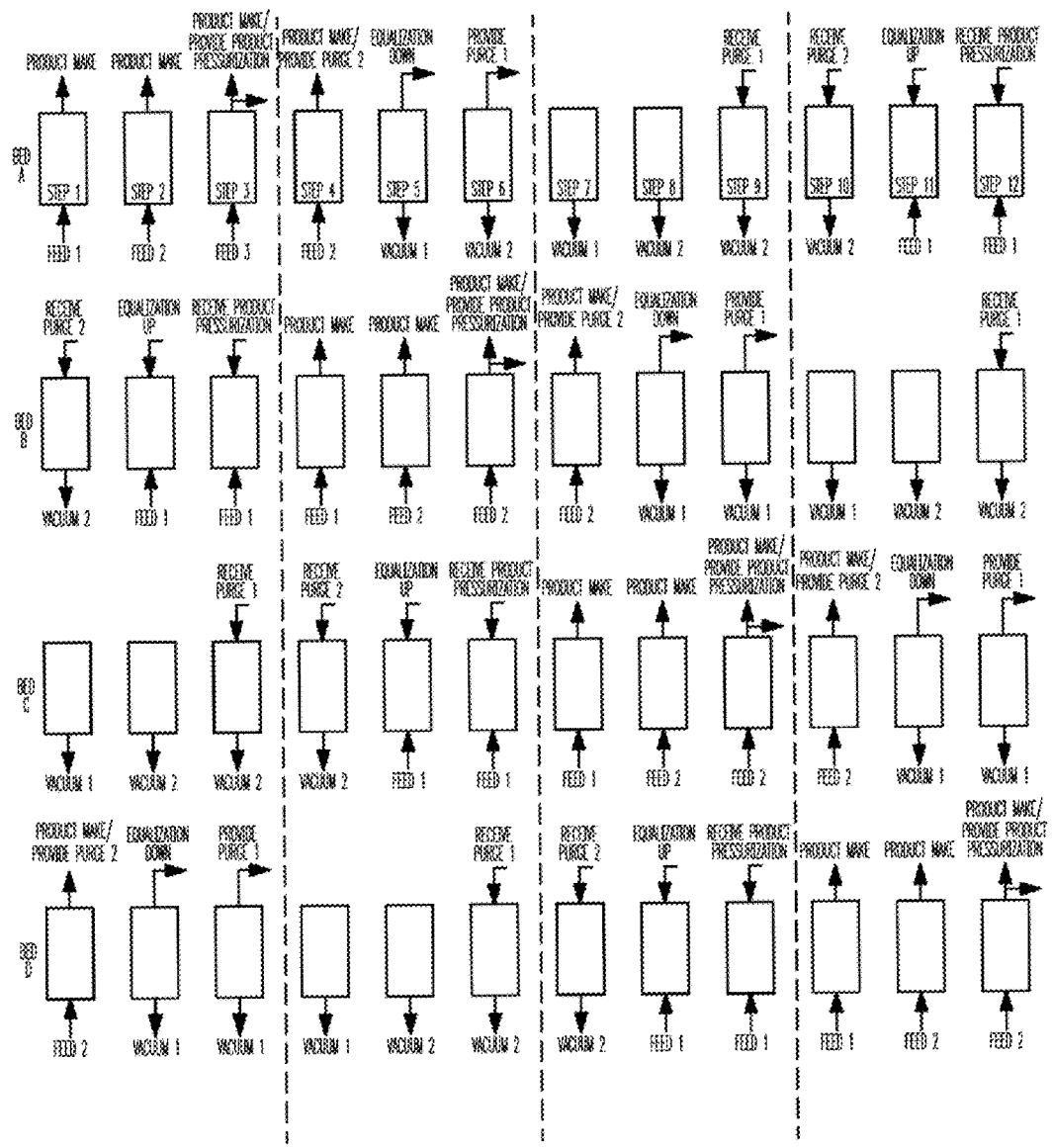
FIG. 3 is a schematic illustrating a four bed VPSA column cycle as set forth in U.S. Pat. No. 7,396,387.
Figure 4:
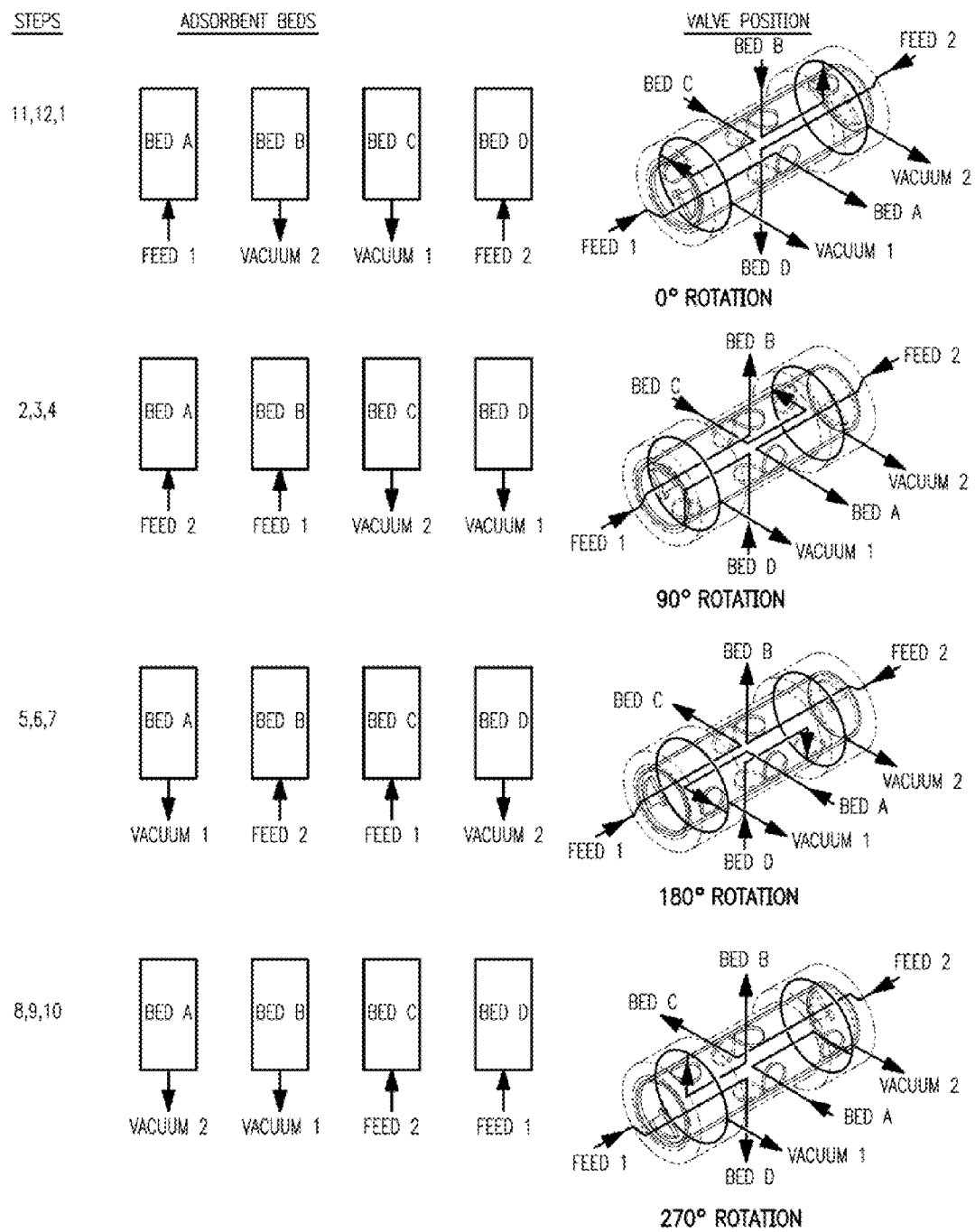
FIG. 4 is a schematic illustrating multi-port indexing drum valve positions in a VPSA column cycle of FIG. 3.
Figure 5:
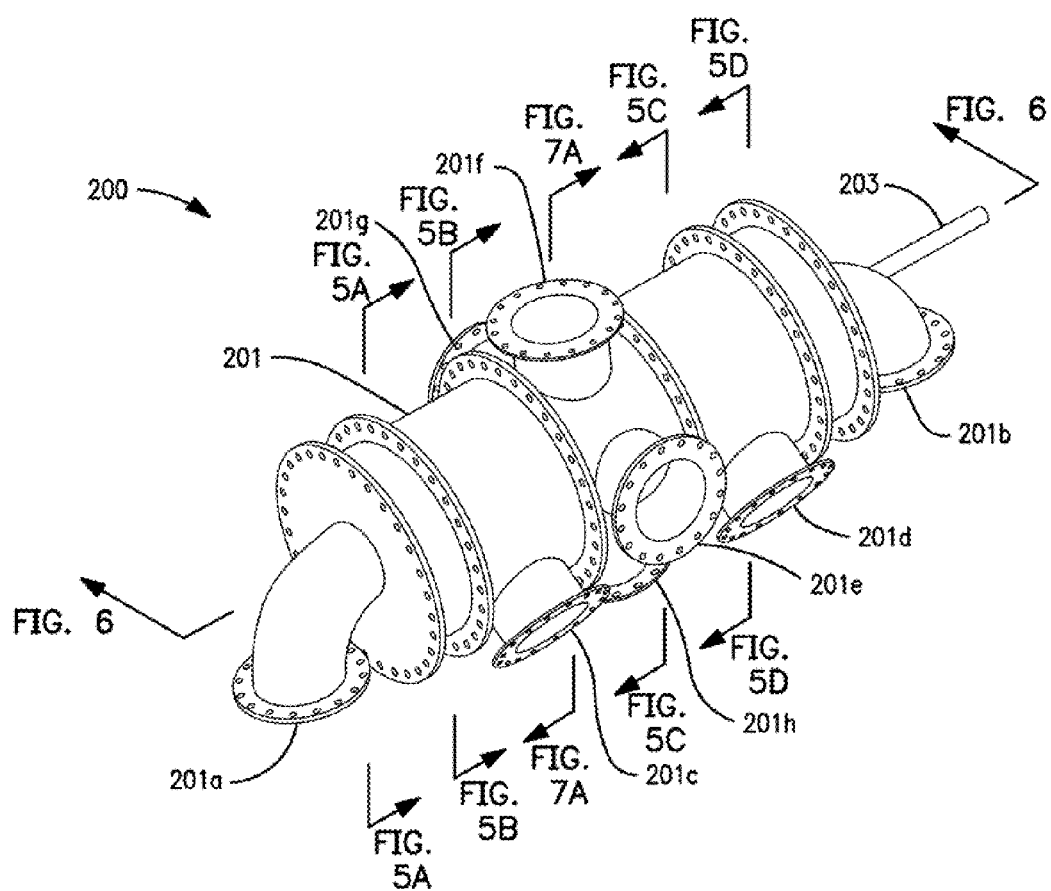
FIG. 5 is a schematic illustrating an overall isometric view of a multi-port indexing drum valve of the present invention.

In order to describe the novel features of the drum valve of this invention, the prior art four bed VPSA $O_2$ cycle of Baksh et al., (see FIG. 5 of U.S. Pat. No. 7,396,387) will be used as an example of the prior art. FIG. 3 of the present invention shows the prior art four bed VPSA $O_2$ cycle of Baksh et al., herein included, adding clarity in disclosing the novel features of the drum valve. As indicated in FIG. 3, there are 12 steps in the four bed VPSA $O_2$ cycle, and at any instant, two beds are receiving feed gas from two feed compression devices (preferably one rotary-lobe blower for Feed 1 and one centrifugal compressor for Feed 2), and two beds are being evacuated by two vacuum devices (preferably one rotary-lobe blower for Vacuum 1 and one centrifugal compressor for Vacuum 2). FIG. 4 shows the drum valve positions in executing the 12 steps in the four bed VPSA $O_2$ cycle of FIG. 3. More specifically, in FIG. 4, the drum valve in 0° rotation corresponds to the valve position to execute steps 11, 12 and 1 of the VPSA $O_2$ cycle of FIG. 3. Similarly, the drum valve in 90° rotation corresponds to the valve position to execute steps 2, 3 and 4 of the VPSA $O_2$ cycle of FIG. 3; 180° rotation corresponds to the valve position to execute steps 5, 6 and 7, and 270° rotation corresponds to the valve position to execute steps 8, 9 and 10. Thus, as the valve rotates in increments of 90°, at each valve position, three steps (e.g., steps 2, 3 and 4 for 90° rotation in FIG. 4) in the VPSA $O_2$ cycle are executed via the novel porting features on the drum valve. At the completion of one complete revolution of the drum valve, all twelve steps in the VPSA $O_2$ cycle of FIG. 3 are executed.

Referring to FIG. 2, when considering the drum valve 200 in one of its four indexed positions (e.g., 0° rotation), feed air from the rotary-lobe feed blower 2 and feed air aftercooler 3 is passed in line 4 to drum valve 200, from which gas is passed from feed port 201*a* through bed port 201*e* to line 47 for passage to bed A. Likewise, feed air from centrifugal feed air compressor 10 and feed air aftercooler 11 is passed in line 12 to drum valve 200, from which gas is passed from feed port 201*b* through bed port 201*h* to line 50 for passage to bed D. Similarly, gas is discharged from bed B in line 48 to drum valve 200, from which gas is passed from bed port 201*f* through vacuum port 201*d* to line 13 for passage to centrifugal vacuum compressor 14. Similarly, gas is discharged from bed C in line 49 to drum valve 200, from which gas is passed from bed port 201*g* through vacuum port 201*c* to line 5 for passage to the rotary-lobe vacuum blower 6. The valves located at the top or discharge end of the beds operate in the same manner as described in the prior art of U.S. Pat. No. 7,396,387.

FIG. 5 shows an overall isometric view of the drum valve 200 of FIG. 2. The outside valve case structure (i.e., the housing or casing) of the valve body 201 is cylindrical and contains a plurality of radial flow (discharge) ports 201*e*, 201*f*, 201*g*, and 201*h* along its outer periphery. The valve has two axial feed inlet passages, 201*a* and 201*b* at opposite ends of the valve body, two radial vacuum outlet passages, 201*c* and 201*d* on either side of the flow discharge ports, and a drive shaft 203. The outer casing 201 of the valve body can be sub-divided into several compartments which are sealed off from one another using seals as described herein.

FIGS. 5A-5D, FIG. 6, and FIGS. 7A-7B show cross-sectional views of the drum valve with similar reference numbers and letters to those used in FIG. 5 to indicate common features. In addition, FIGS. 5A-5D specifically illustrate the drum valve fluid flow paths when the plug 202 is positioned at 0° rotation (i.e., executing steps 11, 12 and 1 of FIG. 3).

Figure 5A:
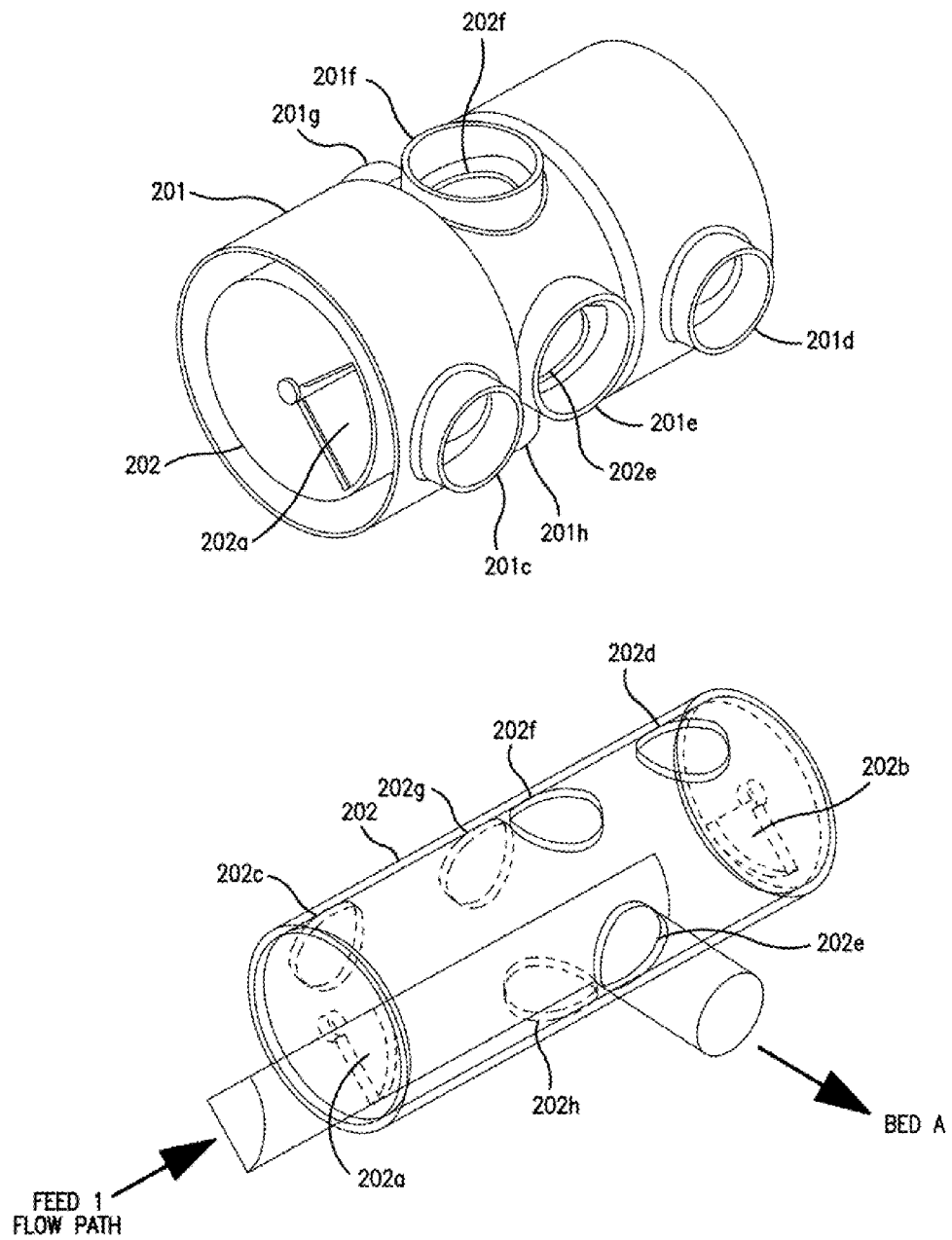
FIG. 5A is a schematic illustrating a sectional view of a multi-port indexing drum valve of the present invention at 0° rotation depicting Feed 1 flow path.

Referring to FIG. 5A, the drum valve 200 has a cylindrical casing 201 containing a matching partitioned cylindrical plug 202. The valve casing 201 contains a number of ports 201*c*, 201*d*, and 201*e*-201*h* to which piping flanges are attached. The plug 202 is fabricated with openings 202*a*-202*h* which correspond identically to the ports in the valve body. Due to the partitioned design of the plug 202, port 202*a* (Feed 1 flow) is always in communication with port 202*e* (flow to adsorbent bed A in this 0° rotation case). The plug 202 can be rotated around a central axis. The rotation of the plug 202 for this design is to be counterclockwise when looking from the Feed 1 end, however, the rotation may be either clockwise or counterclockwise depending upon the layout of ports used in the design.

Figure 5B:
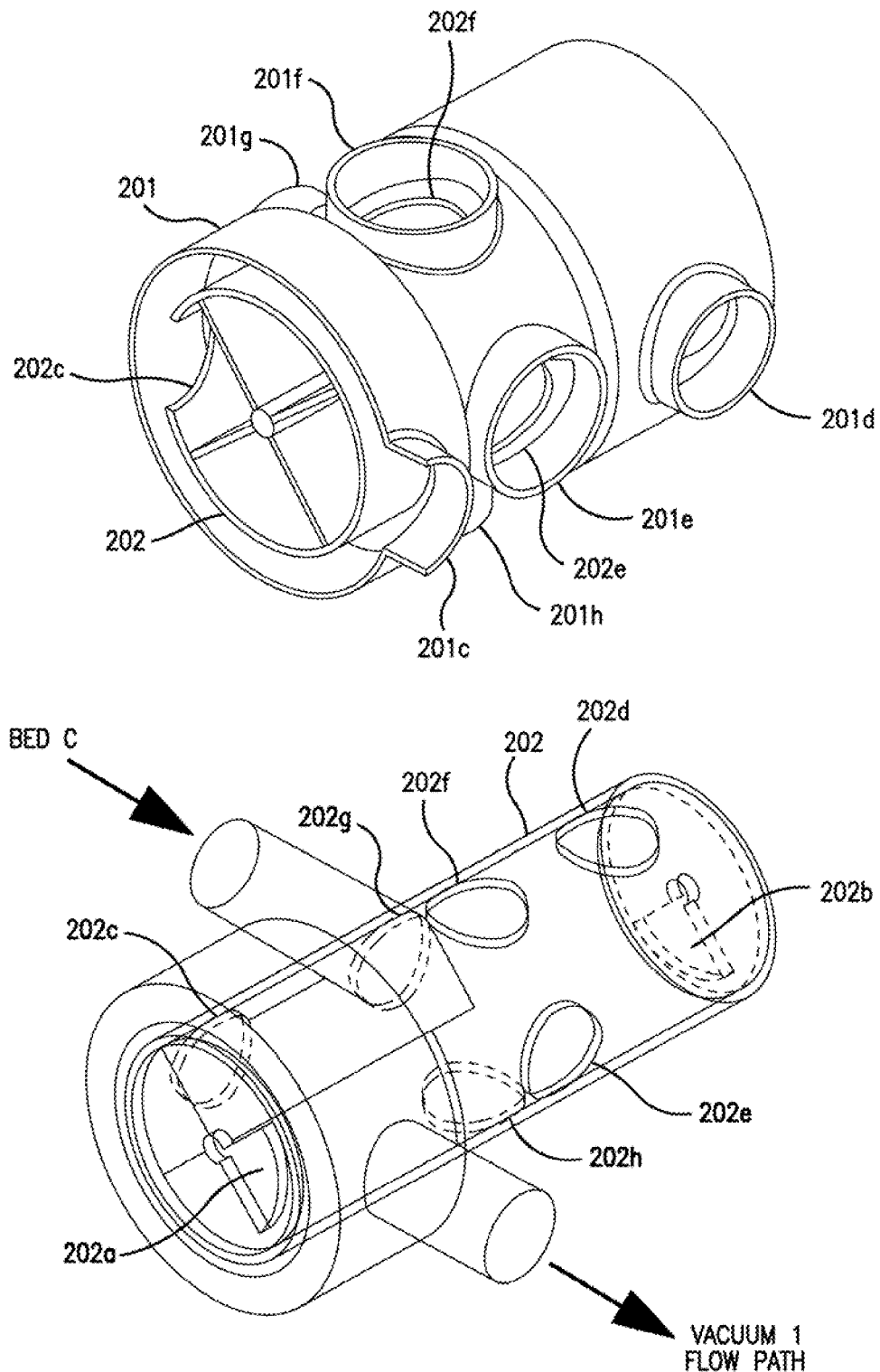
FIG. 5B is a schematic illustrating a sectional view of a multi-port indexing drum valve of the present invention at 0° rotation depicting Feed 2 flow path.
Figure 5C:
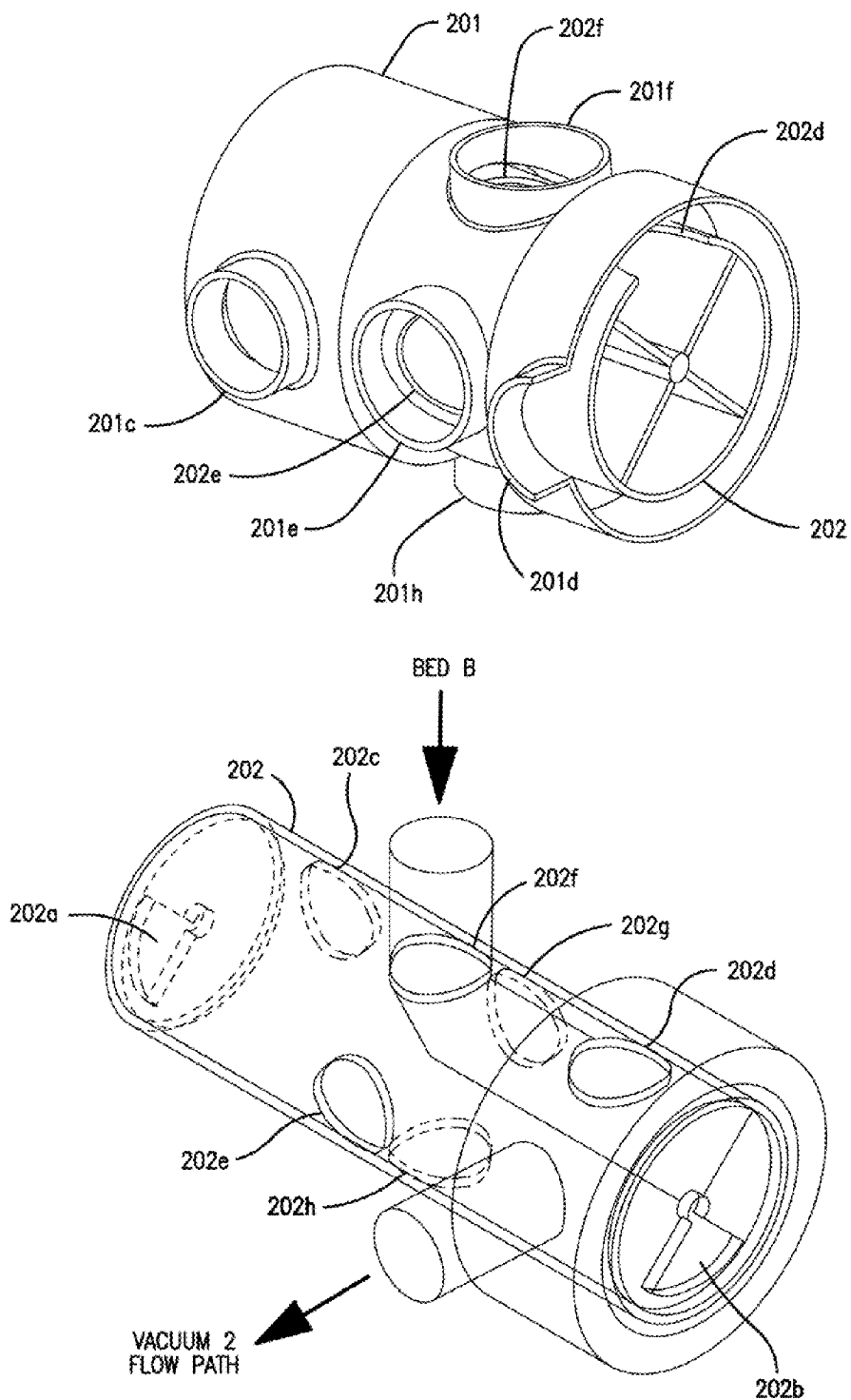
FIG. 5C is a schematic illustration a sectional view a multi-port indexing drum valve of the present invention at 0° rotation depicting Vacuum 1 flow path.
Figure 5D:
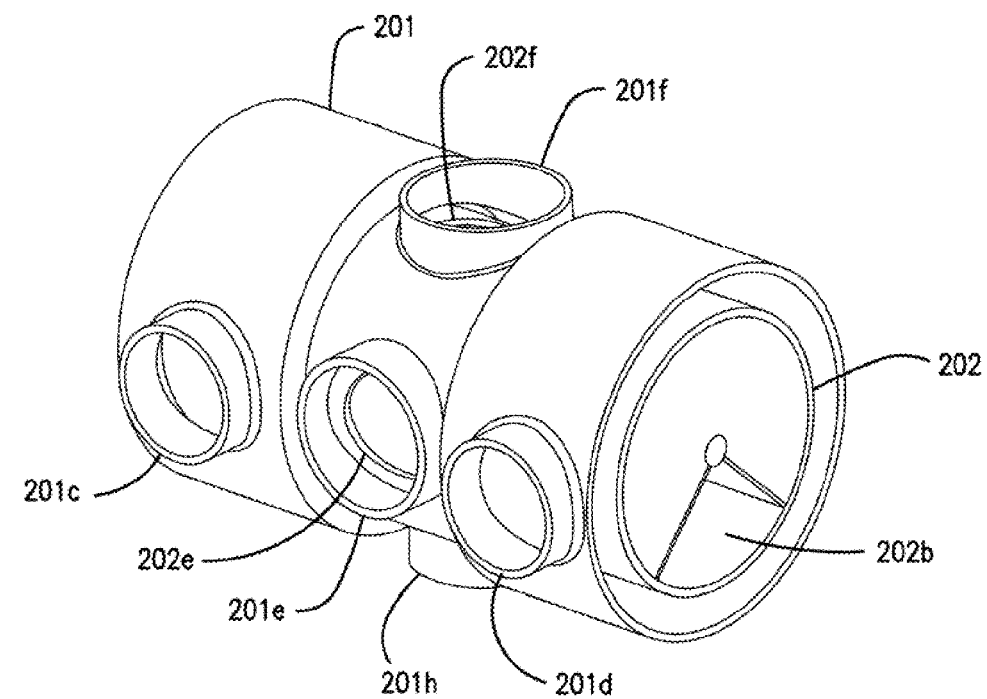
FIG. 5D is a schematic illustration a sectional view of a multi-port indexing drum valve of the present invention at 0° rotation depicting Vacuum 2 flow path.
Figure 5D:
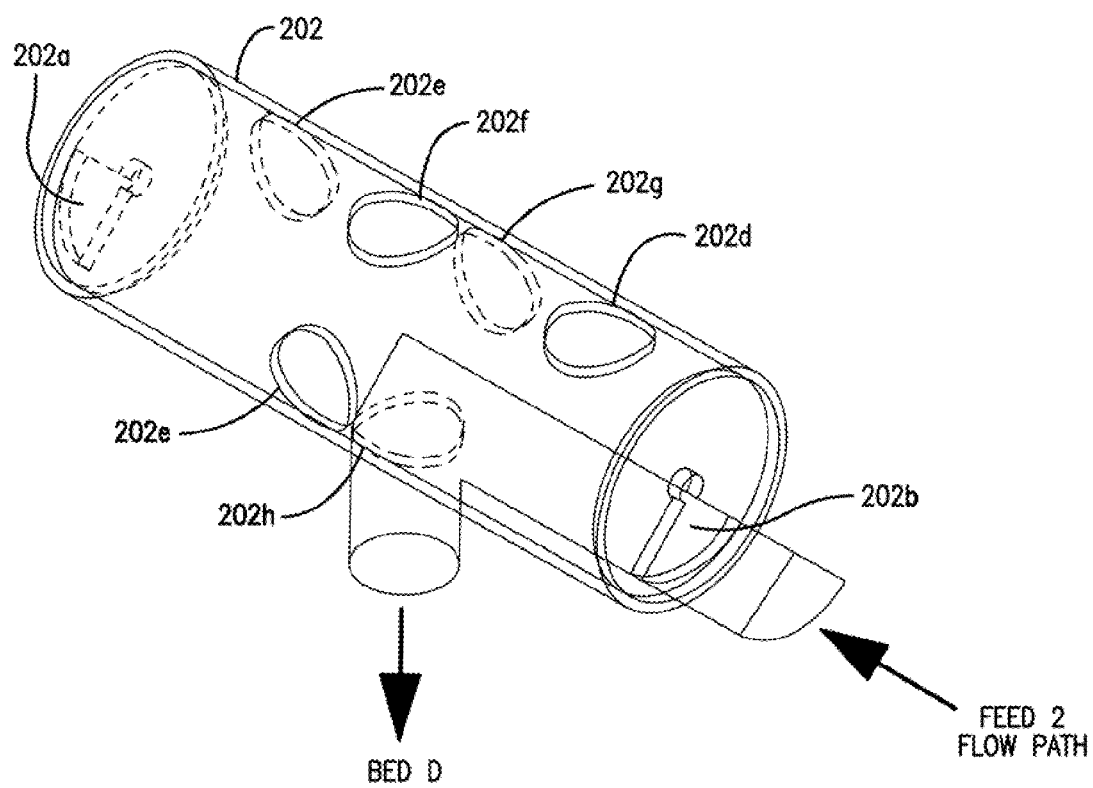

Referring to FIG. 5B, the partitioned design of the plug 202 is more clearly depicted. Port 202*c* (Vacuum 1 flow) is always in communication with port 202*g* (flow from adsorbent bed C in this 0° rotation case). When gas flows from port 202*g* and out of port 202*c*, it travels circumferentially along the outside of the plug 202 to port 201*c* as shown. Similarly, in FIG. 5C, port 202*d* (Vacuum 2 flow) is always in communication with port 202*f* (flow from adsorbent bed B in this 0° rotation case). When gas flows from port 202*f* and out of port 202*d*, it travels circumferentially along the outside of the plug 202 to port 201*d* as shown. Finally, in FIG. 5D, port 202*b* (Feed 2 flow) is always in communication with port 202*h* (flow to adsorbent bed D in this 0° rotation case).

Figure 6:
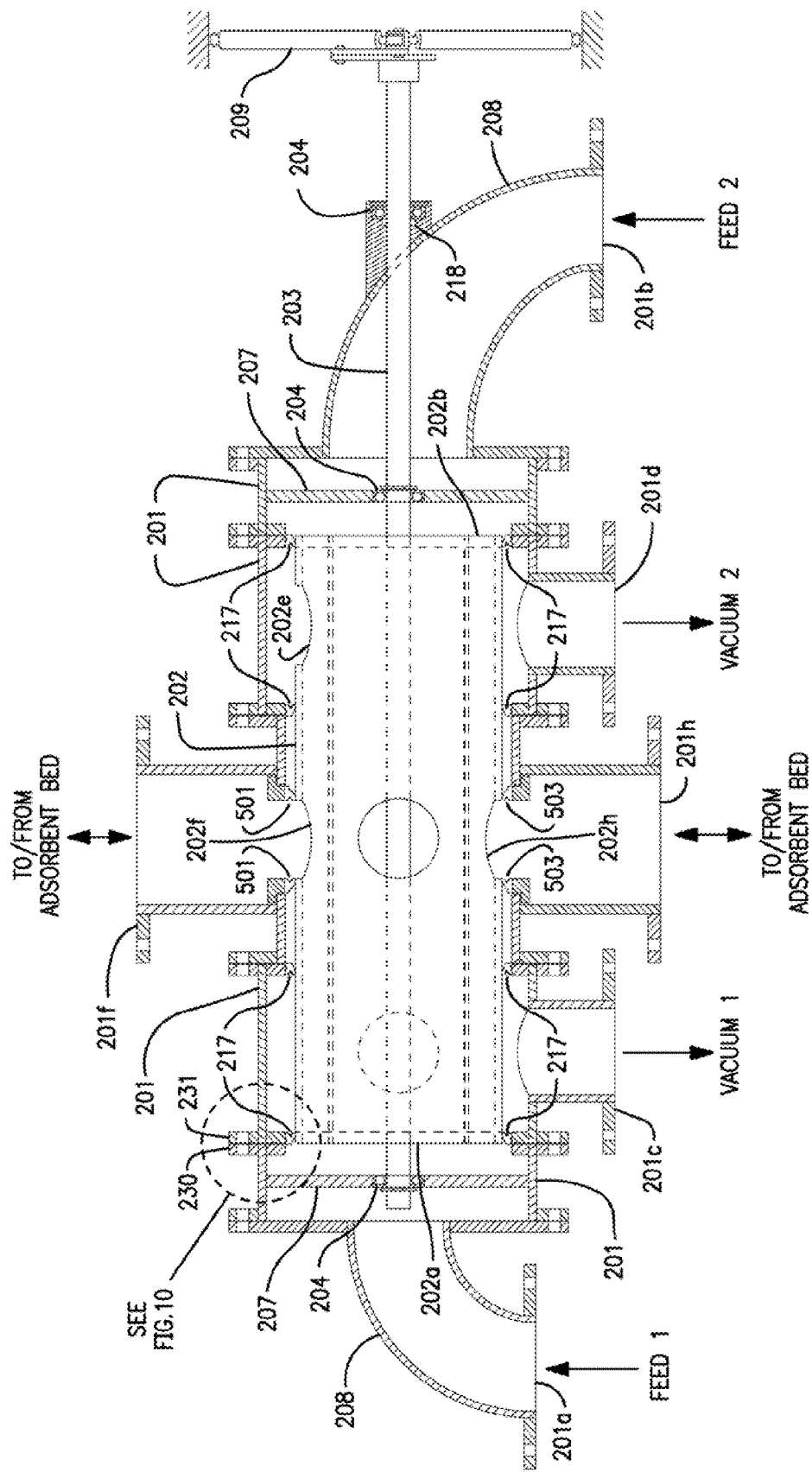
FIG. 6 is a schematic illustrating a side sectional view of a multi-port indexing drum valve of the present invention at 0° rotation.

FIG. 6 shows a side cross-sectional view of the drum valve 200. The plug 202 is supported by bearings 204 centered at the opposite ends of the valve body. The bearings, in turn, are supported by struts 207 which extend to the inner surface of valve casing 201. The shaft 203 of the plug 202 extends through the two ends of the valve so that plug 202 may be positioned by rotation of the shaft. One or both ends of valve casing 201 may be fitted with a piping elbow 208 through which the shaft 203 of the plug 202 may be extended for ease of attachment of a pneumatic, hydraulic, or electric based indexing drive mechanism 209. In addition, a bearing housing is constructed on one of the elbows 208. A commercially available shaft seal 218 is placed in the bearing housing to avoid any leakage through the bearing housing. In the operation of the drum valve 200, the plug 202 may be computer programmed to function in any desired sequence.

Plug 202 is a relatively thin-walled drum (e.g., the wall is less than 0.5 inch thick, preferably less than 0.375 inch thick). The benefit of the thin wall is that the valve has a relatively low mass. This permits operation at high speed (i.e., less than 1.0 seconds per port change). The plug 202 is preferably constructed from materials having relatively low weight, high tensile strength and a high Young's modulus. Examples of such materials are high strength steel, aluminum or carbon fiber.

Figure 7A:
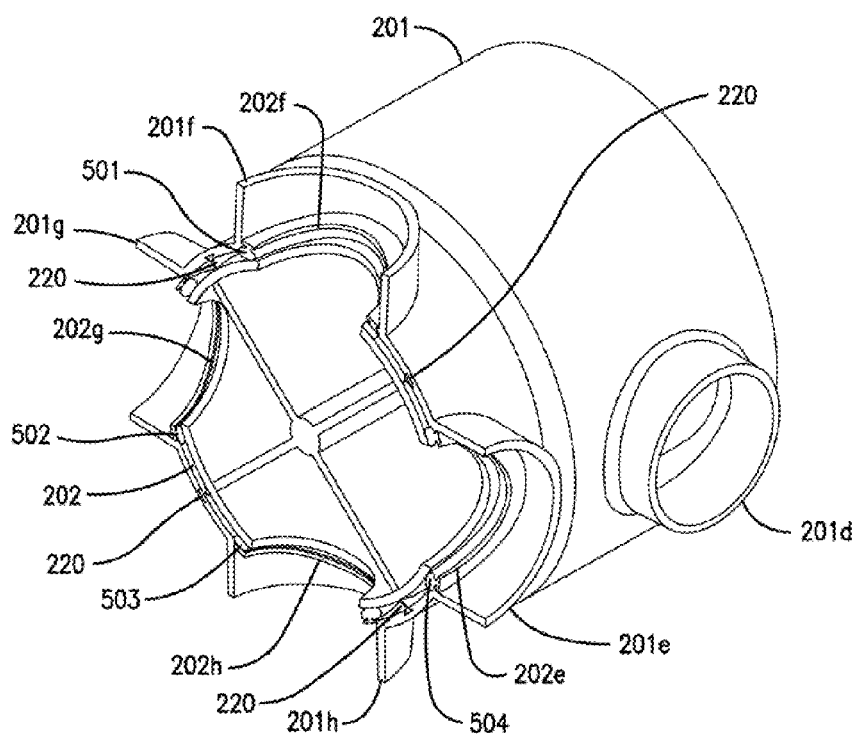
FIG. 7A is a schematic illustrating a sectional view of a multi-port indexing drum valve of the present invention depicting locations of the seals.
Figure 7B:
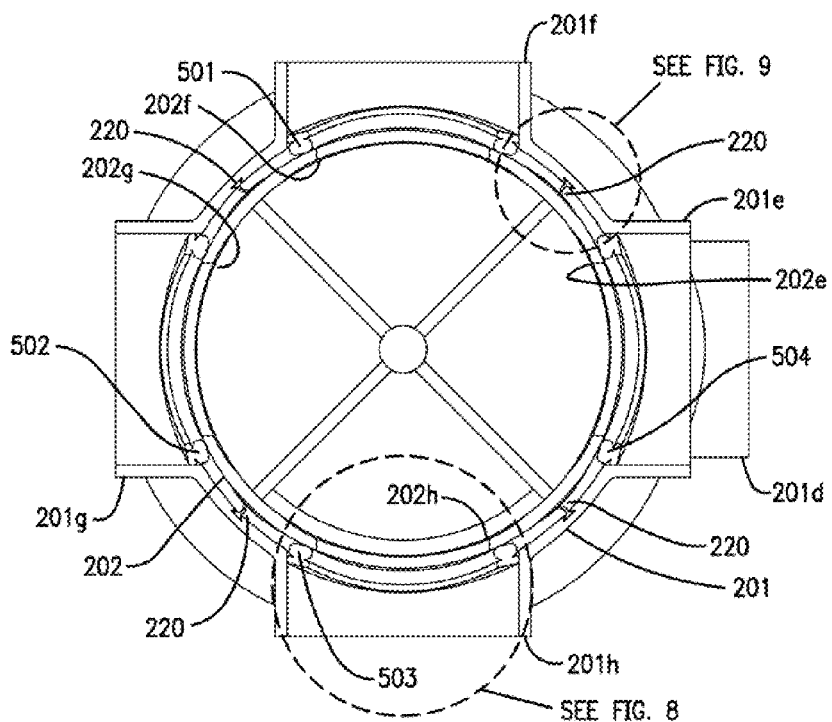
FIG. 7B is a schematic illustrating an end view of a cross-section of a multi-port indexing drum valve of the present invention depicting locations of the seals.
Figure 8:
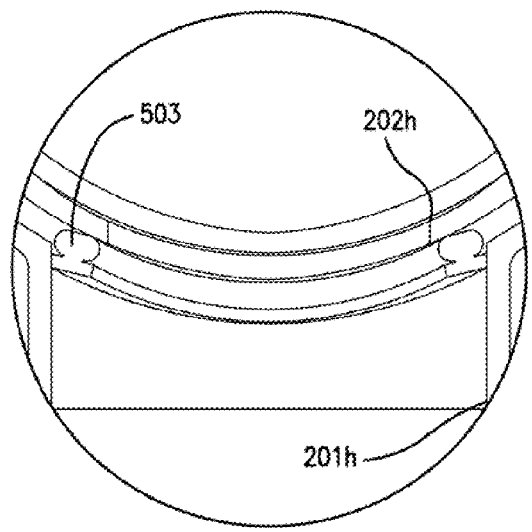
FIG. 8 is a schematic illustrating an inflatable seal.
Figure 9:
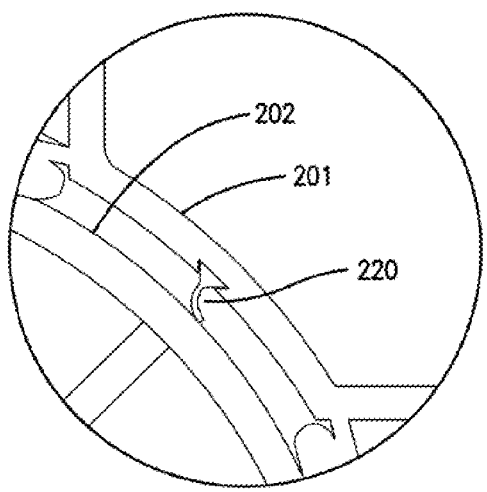
FIG. 9 is a schematic illustrating a wiper seal.
Figure 10:
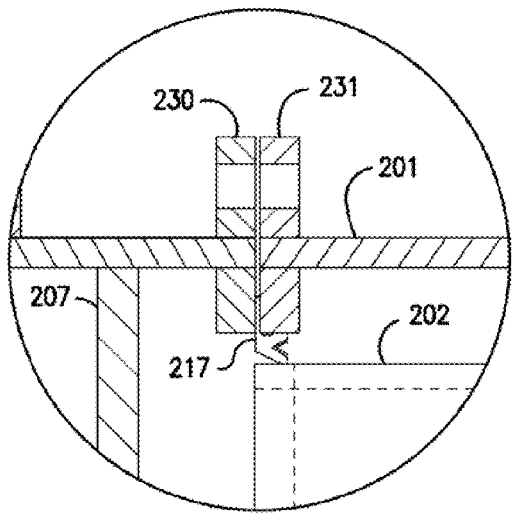
FIG. 10 is a schematic illustrating a circumferential seal.

FIGS. 7A-7B show simplified cross-sectional views of the valve in FIG. 5; whereas, FIGS. 8-10 show expanded sections depicting the various seals used in the invention. Referring to FIGS. 7A-7B and FIG. 8, in the preferred mode of operation, the adsorbent bed port seals 501-504 are pneumatically operated inflatable seals. Also, in accordance with this invention, these inflatable seals are attached around the fish mouth shaped interior of bed ports 201e-201h of FIGS. 7A-7B. Furthermore, the inflatable seal's flexibility permits it to conform to the fish mouth shape of the gap that needs to be sealed. The assembly of the inflatable seal can be made modular by attaching the inflatable seal onto a fish mouth shaped metal ring and the ring can then be attached to the inside of bed port 201e-201h. Inflatable seals 501-504 of FIGS. 7A-7B will use an instrument air supply via one or multiple air connectors to inflate the seals. The seals may have additional air connector (s) for extracting a vacuum to deflate the seal in a rapid fashion. The inflation and deflation of the inflatable seal will be synchronized with the movement of the plug 202. The inflatable seals 501-504 will inflate when the plug 202 stops moving and seal the gaps between the plug 202 and bed ports 201e-201h. The inflatable seals deflate before the plug 202 advances to its next indexed position.

The inflatable seal has various advantages such as minimizing the number of parts, quick action and non-wearing design due to the lack of contact with moving surfaces. Inflatable seals are commercially available and have been used in clamping and sealing doors, mostly in paper, food and nuclear equipment. Several seal suppliers manufacture inflatable seals that could be used in this invention; however, only long life cycle seals (>5 million cycles) are recommended for use in this invention to manage operating cost of the VPSA system. Thus, the inflatable seal disclosed in this invention was developed in collaboration with seal suppliers to have extended life and sealing ability as demanded by the sealing requirements during the various valve positions in FIG. 4. The inflatable seal design developed assured durability of the seal by using a low stress inducing cross section, high wear material and placing manufacturing quality controls at the supplier. In the preferred mode of operation, the inflatable seal is manufacturer from ethylene propylene diene monomer (EPDM). Other materials like nitrile and butyl could be used without deviating from the scope of the invention. Furthermore, in the preferred mode of operation, the inflatable seal has a fabric (e.g., Nomex®) reinforced cross section for increased life and added pressure rating. Other fabrics like Kevlar® and nylon can be used instead of Nomex® in alternative embodiments of this invention. Also, in an alternative embodiment, spring energized PTFE seals could be used for sealing of the bed ports 201e-201h in FIGS. 7A-7B.

In the preferred mode of operation, the bed port inflatable seals 501-504 in FIG. 7B provide sufficient sealing for all the beds when plug 202 is stationary. However, when plug 202 is in motion (i.e., as it advances between the four positions illustrated in FIG. 4), the bed port seals are deflated, allowing some cross-communication or leakage between the ports. To minimize the leakage between bed ports 201e-201h, wiper seals are used and/or the drum is rotated quickly (e.g., in less than 1 second) by fabricating it from light weight materials like aluminum or composite materials (e.g., carbon fiber or aluminum backed epoxy). FIG. 9 shows the incorporation of wiper seal 220 in the drum valve. More specifically, four identical wiper seals 220 are installed in the inside diameter surface of the valve casing 201 at 90° intervals to mitigate the leakage as shown in FIGS. 7A-7B and FIG. 9. In the preferred mode of operation, these wiper seals have standard dove tail profile on one side which slides into a matching dove tail groove machined between two bed ports on the inner diameter surface of valve casing 201. The other side of the wiper seal comprises of a thin blade which slides over the plug 202 as the plug rotates. The wiper seal forms a barrier between the bed ports 201e-201h as the plug rotates. Wiper seals can be fabricated out of ordinary wear resistant rubber. Generally wiper seals are used in rotary applications to seal systems from dirt and other solid and liquid impurities.

FIG. 10 shows the circumferential seals 217 of FIG. 6. In the preferred mode of operation, the circumferential seals 217 are produced from a spring energized polytetrafluoroethylene (PTFE) material. The PTFE seal is held stationary by bolting the flanges of the outer drum 230 and 231 of FIG. 10. In addition, seal 217 has a dual lip configuration. One lip rests on the inside diameter surface of flange 231 and the other lip wears against the outer diameter surface of plug 202 at a very low rate. A spring placed between the two lips of the seal ensures sufficient pressure is applied to the lips. Spring energized PTFE seals are a commodity used in rotary equipment like pumps and turbines. The seals disclosed in this invention disclosure have been developed specifically for the application and have proven to have extended life and sealing ability as demanded by the VPSA process steps and cycle time. Seal material, cross section, spring material and design were selected for enhanced durability. Preferred material for the seal is PTFE, although other variants of polymers with or without spring support can be used.

Figure 11:
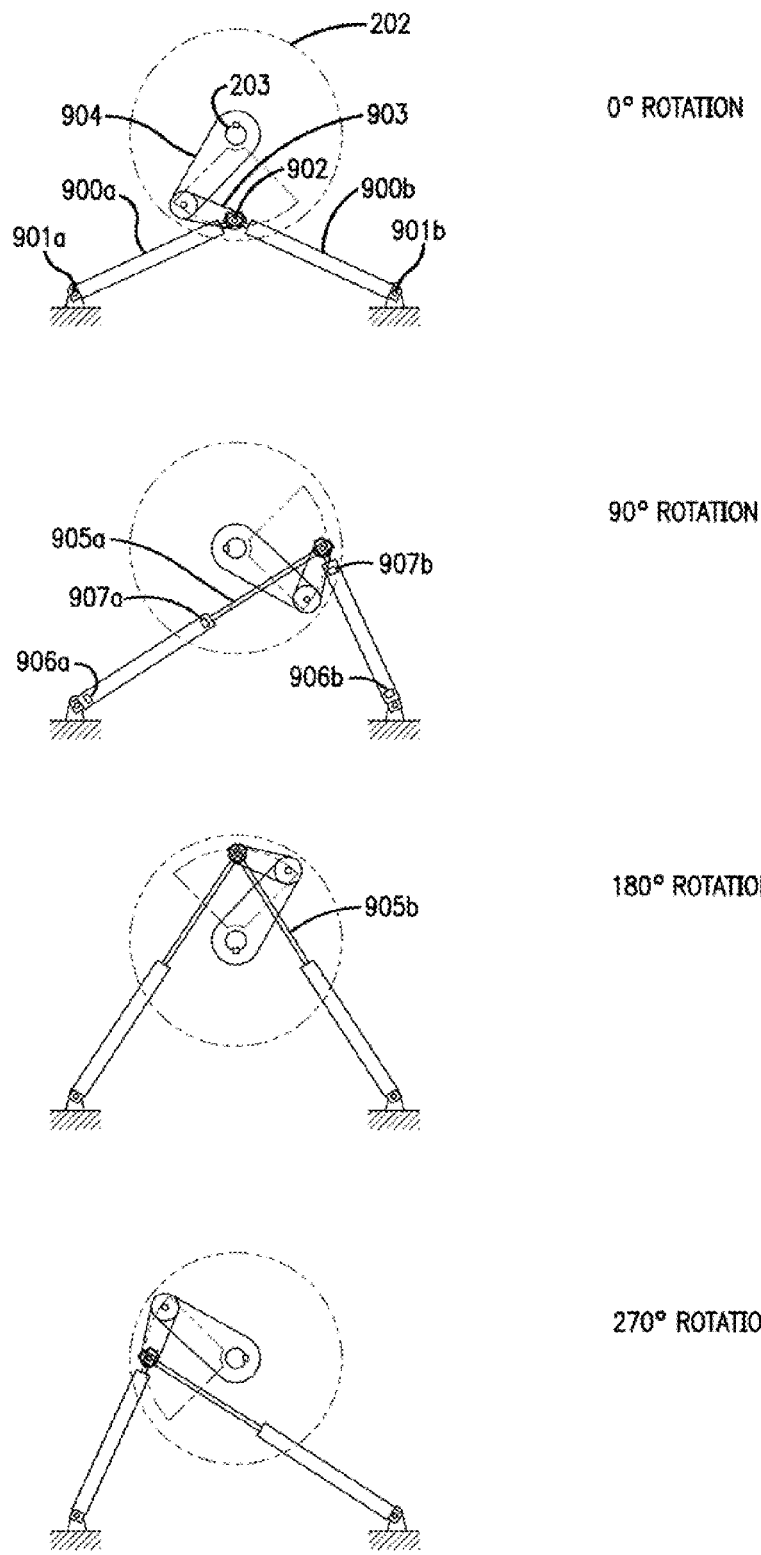
FIG. 11 is a schematic illustrating a mechanical sequence of the two-piston drive mechanism of the present invention.

FIG. 11 illustrates the counterclockwise mechanical sequence of the two piston indexing drive mechanism (e.g., U.S. Pat. No. 3,550,477) during operation of the drum valve as shown in FIG. 4. In a preferred mode of operation, the VPSA system of this invention uses two pneumatic or hydraulic pistons to rotate the drum valve, using intermittent-motion through four successive 90° turns totaling 360° as illustrated in FIG. 11. This type of indexing drive mechanism provides considerable torque to start rotation (due primarily to resistance caused by circumferential seals 217), has the ability to provide braking force to stop rotation (due the rotary inertia associated with plug 202), and is relatively low cost and less complex when compared to indexing drive mechanisms that use electric servo motors with gear reducers and brakes.

Referring to FIG. 11, the preferred indexing drive mechanism is comprised of two pneumatic or hydraulic double acting pistons 900a and 900b, which are supported by their respective trunnions 901a and 901b mounted to a fixed base. At both ends of each piston are reed switches 906a, 906b, 907a and 907b, which provide positive indication of fully retracted or fully extended pistons. At the end of each piston is a clevis 902 which is pivotally connected to a link 903. The link 903 is pivotally connected to crank 904 which is keyed to shaft 203. Also, FIG. 11 illustrates the counterclockwise mechanical sequence of both the fully extended or fully retracted piston rods 905a and 905b during operation of the drum valve as shown in FIG. 4. As discussed hereinabove, the inflation and deflation of the inflatable seal 501-504 will be synchronized with the movement of the plug 202/indexing drive mechanism by using the reed switch signals (i.e., when plug 202 is in motion, the bed port seals are deflated).

FIG. 12A shows the pneumatic or hydraulic double acting piston 900a which is supported by its trunnion 901a and mounted to a fixed base. As illustrated in FIG. 12A, the length from its trunnion 901a to clevis 902 pin and fully extended stroke are based on fixed geometry. FIG. 12B illustrates one half of the indexing drive mechanism. With continued reference to FIG. 12B, the location of the piston trunnion 901a with respect to the center of the shaft 203 and the length of crank 904 are key design parameters to assure that the indexing drive mechanism properly indexes through all four successive 90° turns totaling 360°. However, although FIG. 12B only illustrates one half of the indexing drive mechanism, one skilled in the art would apply the same design principles to the other half.

The following are the set of seven equations used for determining the design specifications of the indexing drive mechanism used for rotating the drum valve at 90° intervals.

$$D_4^2 = R_1^2 + R_2^2 - 2R_1 R_2 \cos(\theta_1) \quad \text{(Eq. 1)}$$

$$\left(\frac{D_4}{2}\right)^2 = R_1^2 + R_3^2 - 2R_1 R_3 \cos(\theta_2) \quad \text{(Eq. 2)}$$

$$\left(\frac{D_4}{2}\right)^2 = R_2^2 + R_3^2 - 2R_2 R_3 \cos(\theta_3) \quad \text{(Eq. 3)}$$

$$S_1^2 = 2\left(\frac{D_4}{2}\right)^2 = \frac{D_4^2}{2} \quad \text{(Eq. 4)}$$

$$\frac{D_4^2}{2} = 2R_1^2 - 2R_1^2 \cos(\theta_4) \quad \text{(Eq. 5)}$$

$$\theta_1 = \theta_2 + \theta_3 \quad \text{(Eq. 6)}$$

$$\theta_4 = 2\theta_2 \quad \text{(Eq. 7)}$$

Where $R_1$, $R_2$ are known based on given cylinder geometry and $R_3$, $D_4$, $S_1$, $\theta_1$, $\theta_2$, $\theta_3$, $\theta_4$ are unknowns.

Solution: Length of crank 904 (center of shaft 203 to link 903 pivot point)=

$$\frac{D_4}{2}$$

and (x,y) coordinates to center of shaft 203 center relative to trunnion 901a are ($R_3 \cos(45°)$, $R_3 \sin(45°)$).

Finally, one skilled in the art would take this design information and incorporate it into a full kinematic and mechanical design of the indexing drive mechanism including but not limited to:

determining the required piston cylinder bore sizes and operating pressures necessary to provide enough force to rotate and stop the drum valve at each of its four successive 90° turns (e.g., using a static force balance analysis);

determining the rate at which the pistons need to extend and retract to rotate the drum valve in the same or less amount of time it would take to open or close conventional on/off valves;

determining the length of the link that provides desirable kinematic movement; and selecting materials and determining required thicknesses of the crank, link, trunnion support, and required size of pins that results in adequate strength and acceptable design stress levels.

Figure 13:
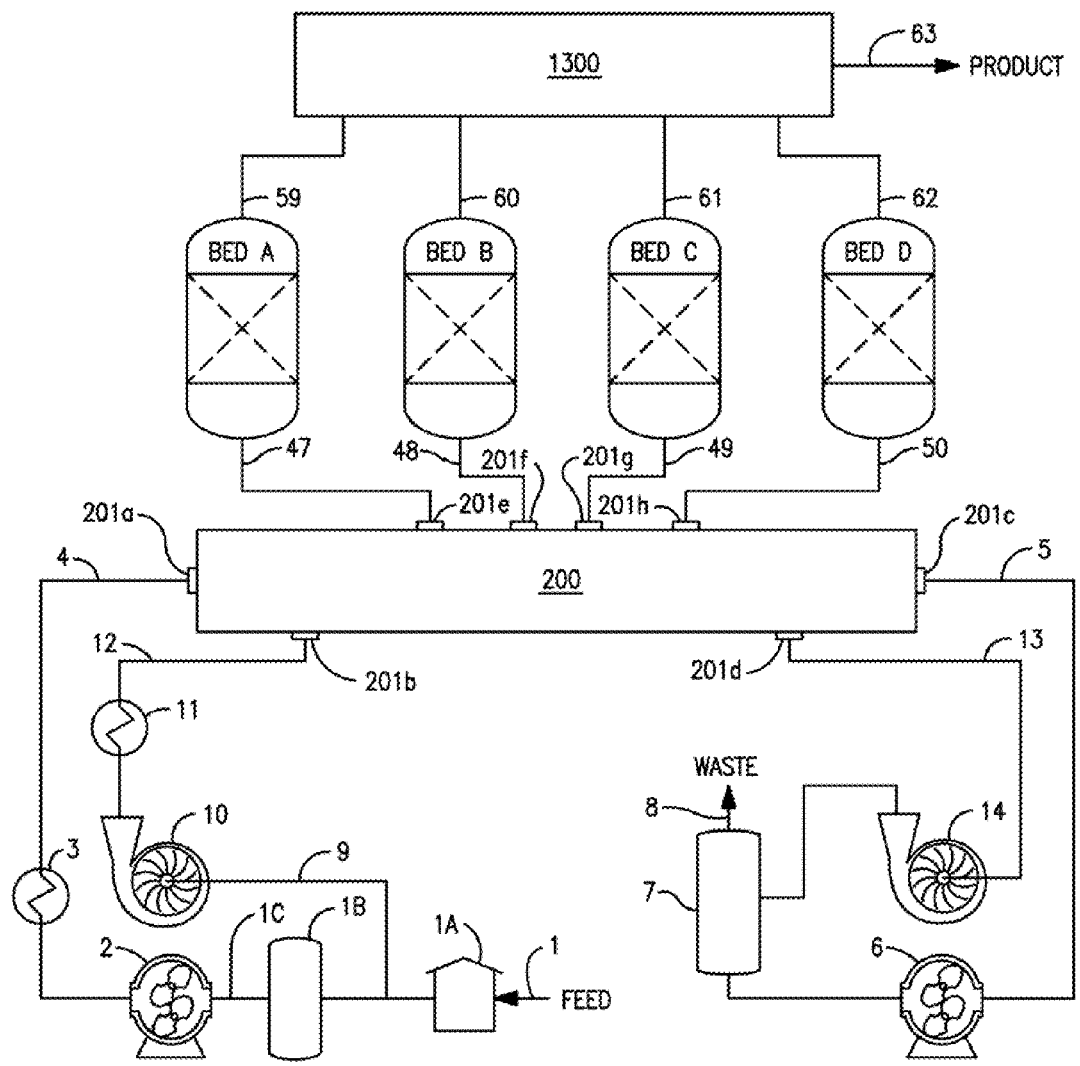
FIG. 13 is a schematic illustrating a four bed VPSA process using two multi-port indexing drum valves.

An alternative embodiment of the present invention is a modified drum valve to replace the 8 conventional on/off valves 51-58 as shown in FIG. 2, at the top or discharge end of the adsorbent beds. FIG. 13 shows one such configuration. Top end drum valve 1300 replaces 8 conventional on/off valves. The mechanism to drive the top end drum valve 1300 can be similar to the indexing drive mechanism 209 shown in FIG. 6. The seals for the top end drum valve can be similar to those illustrated in FIGS. 8-10. In FIG. 13, the two drum valves 200 and 1300 replace 24 conventional valves in the four bed VPSA system to realize the aforementioned benefits associated with the preferred embodiment.

In addition, several other alternative embodiments could be derived from said disclosure without deviating from the scope of this invention. For example, one embodiment comprises a system wherein the total feed flow could be divided into three or more portions, and the corresponding VPSA cycle developed for each case. In cases where the total feed flow is divided into three or more portions, a VPSA system using a multi-port indexing drum valve and axial beds could be attractive.

Furthermore, each bed of the VPSA or PSA system could consist of one or several layers of adsorbents, or mixture of adsorbents. The adsorber configuration selected and choice and arrangement of the adsorbents will be determined based on the type of feed source and VPSA or PSA process operating conditions. Also, in the preferred mode of operation, the adsorption pressure is about 160 kPa (1.6 bar) and the desorption pressure is about 50 kPa (0.5 bar). However, it should be understood that various operating conditions could be used without departing from the scope of this invention. Typically, in the practice of this invention to produce oxygen with purity in the range of 85-95%, the adsorption pressure is preferably in the range of 100 kPa to about 2000 kPa, and the desorption pressure is in the range of 20 kPa to about 100 kPa. In addition, it should be understood that a pre-purifier section (e.g., a layer of alumina) is placed upstream of the zeolite (e.g., Li—X zeolite) bed to remove water and carbon dioxide from the feed air.

In other modes of operation, other adsorbents could be used in the aforementioned PSA processes of this invention. For example, 5A, 13X, and mixed cations zeolites could be used as the $N_2$ selective adsorbent in the VPSA process.

In addition, a single feed compression device could be used to deliver the total feed for the VPSA system of FIG. 2 instead of one rotary-lobe blower and one centrifugal compressor as in the aforementioned description. Similarly, the VPSA system could be modified to use only one vacuum device instead of the two vacuum devices disclosed in said invention. Alternatively, the VPSA can use all rotary-lobe blowers or all centrifugal compressors or any combination thereof.

The adsorbent beds used in the present invention could consist of one or several layers of adsorbents, or mixture of adsorbents. The adsorber configuration selected (e.g., radial, axial, structured, etc.) and choice and arrangement of the adsorbents will be determined based on size of the feed flow, the type of feed source, and PSA process operating conditions. Details of suitable adsorbents and layering of the adsorbents are given by U.S. Pat. No. 6,027,548 (Ackley et al.).

The present invention uses a two piston indexing drive mechanism to rotate the drum valve, using intermittent-motion. An intermittent-motion mechanism is a linkage which converts continuous motion into intermittent motion. Indexing a shaft means rotating it through a specific angle with zero velocity at the beginning and the end. Additional details of such means are given by Bickford, John H., *Mechanism for Intermittent Motion* (Industrial Press Inc., 1972). Alternative modes of indexing the drum valve include, but are not limited to, ratchet mechanisms, Geneva mechanisms and stepping motors.

In addition, the drive mechanism of this invention uses intermittent-motion to rotate the drum valve through four successive 90° turns totaling 360°. In other VPSA or PSA processes (e.g., more than 4 beds), a similar drive mechanism can be designed for using intermittent-motion to rotate a similar drum valve though more than four successive turns (e.g., 60°, 45°) totaling 360°.

Finally, feed other than air (e.g., $H_2$ containing feed mixture from synthesis gas generated from steam methane reforming) could also be used, and the process could be adapted quite easily for desired product or co-products production. For example, co-production of $O_2$ and $N_2$ or $H_2$ and CO could be achieved easily from air feed and $H_2$ containing feed, respectively.

Although the invention has been described in detail with reference to certain preferred embodiments, those skilled in the art will recognize that there are other embodiments within the spirit and the scope of the claims.

What is claimed is:

1. Apparatus for separating components from a fluid mixture comprising:
   a) a first source and a second source of feed fluid;
   b) a first source and a second source of regeneration fluid;
   c) a first, second, third and fourth chamber, each containing an adsorbent for selectively adsorbing a component from feed fluid;
   d) one or more valves, wherein said valve is comprised of (i) a housing, wherein the housing comprises at least two flow ports that are disposed on the outer peripheral wall of the housing and (ii) a rotary plug inside the housing wherein the rotary plug comprises at least one flow passage adapted to connect to said flow ports; wherein the valve is operatively connected to the first source and second source of feed fluid and the first source and second source of regeneration fluid by a plurality of flow passages;
   wherein said valve has a plurality of positions interconnecting said flow passages with said flow ports; said valve in a first position connects said first source of feed fluid to said first chamber and introduces feed fluid therein to selectively remove a desired component from said feed fluid while simultaneously connecting said second source of feed fluid to said fourth chamber and introduces fluid therein to selectively remove a desired component from said fluid while simultaneously connecting said first source of regeneration fluid to said third chamber to evacuate feed fluid from said third chamber and connecting said second source of regeneration fluid to said second chamber to evacuate fluid from said second adsorbent bed; said valve in a second position connects said first source of feed fluid to said second chamber and introduces fluid therein to selectively remove a desired component from said feed fluid while simultaneously connecting said second source of feed fluid to said first chamber and introduces feed fluid therein to selectively remove a desired component from said feed fluid while simultaneously connecting said first source of regeneration fluid to said fourth chamber to evacuate feed fluid from said fourth chamber and connecting said second source of regeneration fluid to said third chamber to evacuate fluid from said third chamber; said valve in a third position connects said first source of feed fluid to said third chamber and introduce feed fluid therein to selectively remove a desired component from said feed fluid while simultaneously connecting said second source of feed fluid to said second chamber and introduce feed fluid therein to selectively remove a desired component from said feed fluid while simultaneously connecting said first source of regeneration fluid to said first chamber to evacuate feed fluid from said first adsorbent bed and connecting said second source of regeneration fluid to said fourth chamber to evacuate feed fluid from said fourth chamber; said valve in a fourth position connects said first source of feed fluid to said fourth chamber and introduces feed fluid therein to selectively remove a desired component from said feed fluid while simultaneously connecting said second source of feed fluid to said third chamber and introduce feed fluid therein to selectively remove a desired component from said feed fluid while simultaneously connecting said first source of regeneration fluid to said second chamber to evacuate fluid from said second chamber and connecting said second source of regeneration fluid to said first chamber to evacuate feed fluid from said first chamber;
   and wherein the valve further comprises at least one inflatable seal between the housing and the rotary plug.

2. The apparatus of claim 1, wherein the inflatable seal is comprised from material selected from the group consisting of ethylene propylene diene monomer rubber, nitrile and butyl.

3. The apparatus of claim 2, wherein the valve further comprises at least one circumferential seal between the housing and the rotary plug, wherein the circumferential seal may be a spring energized polytetrafluoroethylene seal.

4. The apparatus of claim 3, wherein the valve further comprises at least one wiper seal between the housing and the rotary plug.

5. The apparatus of claim 1, wherein the valve further comprises an indexing drive mechanism.

6. The apparatus of claim 5, wherein the indexing drive mechanism is selected from the group consisting of two pistons, an intermittent-motion mechanism, a ratchet mechanisms, a Geneva mechanism and a stepping motor.

7. The apparatus of claim 6, wherein the indexing drive mechanism rotates the valve at 90° intervals.

8. The apparatus of claim 1, wherein the thickness of the rotary plug wall is less than 10% of the diameter of the housing.

9. The apparatus of claim 1, wherein the thickness of the rotary plug wall is between 0.2% to 5% of the diameter of the housing.

10. The apparatus of claim 1, wherein the rotary plug is comprised of a material selected from the group consisting of carbon steel, high strength steel, high strength steel alloy, titanium, aluminum, carbon fiber and composite materials with or without substrates.

11. The apparatus of claim 1, wherein each chamber has a feed end and a discharge end and the valve is connected to each chamber at the feed end.

12. The apparatus of claim 1, wherein each chamber has a feed end and a discharge end and the valve is connected to each chamber at the discharge end.

13. The apparatus of claim 1, wherein each chamber has a feed end and a discharge end and a first valve is connected to each chamber at the feed end and a second valve is connected to each chamber at the discharge end.

14. A method for separating components from a fluid mixture using the apparatus of claim 1, comprising the steps of:
   a) moving said plug to a first position to connect said first source of feed fluid to said first adsorbent bed and introduce feed fluid therein to selectively remove a desired component from said fluid while simultaneously connecting said second source of feed fluid to said fourth adsorbent bed and introduce feed fluid therein to selectively remove a desired component from said fluid, while simultaneously connecting said first source of regeneration fluid to said third adsorbent bed to evacuate feed fluid from said third adsorbent bed and connecting said second source of regeneration fluid to said second adsorbent bed to evacuate feed fluid from said second adsorbent bed;

b) moving said plug to a second position to connect said first source of feed fluid to said second adsorbent bed and introduce fluid therein to selectively remove a desired component from said feed fluid while simultaneously connecting said second source of feed fluid to said first adsorbent bed and introduce fluid therein to selectively remove a desired component from said feed fluid while simultaneously connecting said first source of regeneration fluid to said fourth adsorbent bed to evacuate feed fluid from said fourth adsorbent bed and connecting said second source of regeneration fluid to said third adsorbent bed to evacuate feed fluid from said third adsorbent bed;

c) moving said plug to a third position to connect said first source of feed fluid to said third adsorbent bed and introduce fluid therein to selectively remove a desired component from said feed fluid while simultaneously connecting said second source of feed fluid to said second adsorbent bed and introduce fluid therein to selectively remove a desired component from said feed fluid while simultaneously connecting said first source of regeneration fluid to said first adsorbent bed to evacuate feed fluid from said first adsorbent bed and connecting said second source of regeneration fluid to said fourth adsorbent bed to evacuate feed fluid from said fourth adsorbent bed; and d) moving said plug to said fourth position to connect said first source of feed fluid to said fourth adsorbent bed and introduce feed fluid therein to selectively remove a desired component from said fluid while simultaneously connecting said second source of feed fluid to said third adsorbent bed and introduce feed fluid therein to selectively remove a desired component from said fluid while simultaneously connecting said first source of regeneration fluid to said second adsorbent bed to evacuate feed fluid from said second adsorbent bed and connecting said second source of regeneration fluid to said first adsorbent bed to evacuate feed fluid from said first adsorbent bed.

15. A method for separating components from a fluid mixture comprising the steps of:

a) providing a first source of feed fluid and a second source of feed fluid; a first source of regeneration fluid and a second source regeneration fluid; and first, second, third and fourth chambers, each chamber adapted to selectively remove a component from said feed fluid;

b) providing at least one multipart rotary drum valve containing a rotary plug comprising at least one flow passage, wherein the valve is operatively connected to the sources of feed fluid and the sources of regeneration fluid and the valve having at least one pneumatically operated inflatable seal between the valve housing and the rotary plug;

c) moving said plug to a first position to connect said first source of feed fluid to said first adsorbent bed and introduce feed fluid therein to selectively remove a desired component from said fluid while simultaneously connecting said second source of feed fluid to said fourth adsorbent bed and introduce feed fluid therein to selectively remove a desired component from said fluid, while simultaneously connecting said first source of regeneration fluid to said third adsorbent bed to evacuate feed fluid from said third adsorbent bed and connecting said second source of regeneration fluid to said second adsorbent bed to evacuate feed fluid from said second adsorbent bed;

d) moving said plug to a second position to connect said first source of feed fluid to said second adsorbent bed and introduce fluid therein to selectively remove a desired component from said feed fluid while simultaneously connecting said second source of feed fluid to said first adsorbent bed and introduce fluid therein to selectively remove a desired component from said feed fluid while simultaneously connecting said first source of regeneration fluid to said fourth adsorbent bed to evacuate feed fluid from said fourth adsorbent bed and connecting said second source of regeneration fluid to said third adsorbent bed to evacuate feed fluid from said third adsorbent bed;

e) moving said plug to a third position to connect said first source of feed fluid to said third adsorbent bed and introduce fluid therein to selectively remove a desired component from said feed fluid while simultaneously connecting said second source of feed fluid to said second adsorbent bed and introduce fluid therein to selectively remove a desired component from said feed fluid while simultaneously connecting said first source of regeneration fluid to said first adsorbent bed to evacuate feed fluid from said first adsorbent bed and connecting said second source of regeneration fluid to said fourth adsorbent bed to evacuate feed fluid from said fourth adsorbent bed; and f) moving said plug to said fourth position to connect said first source of feed fluid to said fourth adsorbent bed and introduce feed fluid therein to selectively remove a desired component from said fluid while simultaneously connecting said second source of feed fluid to said third adsorbent bed and introduce feed fluid therein to selectively remove a desired component from said fluid while simultaneously connecting said first source of regeneration fluid to said second adsorbent bed to evacuate feed fluid from said second adsorbent bed and connecting said second source of regeneration fluid to said first adsorbent bed to evacuate feed fluid from said first adsorbent bed.

* * * * *